(12) United States Patent
Ammicht et al.

(10) Patent No.: US 6,885,774 B2
(45) Date of Patent: Apr. 26, 2005

(54) COEFFICIENT COMPUTATION IN IMAGE COMPRESSION USING SET PARTITIONING IN HIERARCHICAL TREES

(75) Inventors: Egbert Ammicht, Budd Lake, NJ (US); Paul David Davis, Mount Tabor, NJ (US); Richard Robert Shively, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/872,810

(22) Filed: Jun. 4, 2001

(65) Prior Publication Data

US 2004/0234146 A1 Nov. 25, 2004

Related U.S. Application Data

(63) Continuation-in-part of application No. 09/429,467, filed on Oct. 28, 1999, now Pat. No. 6,549,673.
(60) Provisional application No. 60/208,141, filed on May 31, 2000.

(51) Int. Cl.[7] .................................................. G06K 9/36
(52) U.S. Cl. ....................... 382/240; 382/232; 382/233; 382/248
(58) Field of Search ................................. 382/240, 248, 382/232, 233; 375/240.19, 240.08; 358/1.9

(56) References Cited

U.S. PATENT DOCUMENTS 5,315,670 A * 5/1994 Shapiro ....................... 382/240
5,764,807 A * 6/1998 Pearlman et al. ........... 382/240
6,381,280 B1 * 4/2002 Lynch et al. ............. 375/240.19

FOREIGN PATENT DOCUMENTS

JP       02001218209 A   *   8/2001   ............ H04N/7/30

OTHER PUBLICATIONS

Kim et al., "New Tree Structure with Conditional Height Difference for Wavelet Transform Image Coding", IEEE vol. 31, No. 2, Jan. 1995, pps. 90–92.*

* cited by examiner

*Primary Examiner*—Anh Hong Do

(57) ABSTRACT

An improved method is disclosed for the encoding phase for Wavelet-based compression of digital data representing an object or image. Subband decomposition transforms the data into hierarchical tree data. Two terms are precomputed: the highest bit-plane in which any descendant of a node v has a non-zero bit ($B_1(v)$) and the highest bit-plane in which any indirect descendant (grandchild and beyond) becomes significant ($B_2(v)$). Node traversal is initiated but its extent is limited by a fixed bit-budget. The number of bits emitted by a node as a function of the bit-plane are counted through to the last bit-plane which exhausts the bit-budget. The user can predetermine the coefficient, bit-plane and specific bit at which the algorithm will halt. The tree structure is read only once, thus greatly accelereating the encoding and reducing the memory reference rate by a factor of 2 or more. Accumulators for each of the stacked bit-planes are provided which are incremented as each said Wavelet coefficient is produced, by the number of bits that the coefficient adds to the relevant bit-plane.

18 Claims, 19 Drawing Sheets

POST PROCESSOR BIT RE-ORDERING

THE ORIGINATING NODE OF BITS IN THE ENCODER
BIT-STREAM OUTPUT AS A FUNCTION OF BIT-PLANE
AND BIT NUMBER FOR THE REFERENCE

TRAVERSE BY "SIBLINGS FIRST, THEN SUB-TREES"

|  | BOTH | 756 x 512 | 1920 x 1088 |  |
|---|---|---|---|---|
| AVERAGE DIFFERENCE | 0.38 | 0.55 | 0.34 | DB |
| STD DEVIATION | 0.17 | 0.09 | 0.16 | DB |
| MAX | 0.72 | 0.72 | 0.62 | DB |
| MIN | 0.01 | 0.46 | 0.01 | DB |

COMPARISON OF PSNR VALUES ACHIEVED BY THE
SPIHT AND LIFTS REFERENCE ALGORITHMS

FIG. 9

LOGIC TO HISTOGRAM AND THRESHOLD BIT COUNTS BY BIT PLANE

COEFFICIENT COMPUTATION IN IMAGE COMPRESSION USING SET PARTITIONING IN HIERARCHICAL TREES

REFERENCES TO RELATED APPLICATIONS

This application is a continuation-in-part of application Ser. No. 09/429,467 filed on Oct. 28, 1999 now U.S. Pat. No. 6,549,673; and is based in part on Provisional application No. 60/208,141 filed May 31, 2000.

TECHNICAL FIELD

This invention relates to techniques for data compression to realize more efficient data storage and transmission. More particularly, the invention is a family of processes which comprise a generalization of set partitioning in hierarchical trees for image compression that is less complex computationally and requires less memory overhead.

BACKGROUND OF THE INVENTION

Wavelet-based compression of images for storage and transmission involving hierarchical subband decomposition is an attractive way for achieving needed computational and coding efficiency. A desirable property of compression schemes is that if the compressed bit stream is truncated at an arbitrary point, the bit stream contains a lower rate representation of the image. Consequently, bits are transmitted in the order of importance. This embedded property can be applied, for example, to budget a fixed number of bits per frame, such as in constant frame-rate synchronous bit rate video communications. It further allows coding to be terminated when a given distortion metric is met, as in archiving images.

One of the prior art approaches for compressing the wavelet coefficient array by exploiting its statistical properties, is a process known as set partitioning in hierarchical trees (hereinafter, "SPIHT"). The process is described in U.S. Pat. No. 5,764,807 to Pearlman et. al., issued June, 1998. SPIHT in turn is a refinement of a process known as Embedded Zerotree Wavelet ("EZW") which is described in U.S. Pat. No. 5,315,670 to Shapiro, issued June 1994.

These patents to the extent relevant are hereby incorporated by reference. By structuring the data in hierarchical tree sets that are likely to be highly correlated, the EZW process exploits the self-similarity of the wavelet transform at different scales. Pearlman et. al. teaches the further partitioning of the data into lists, to gain additional compression.

More specifically, the scheme of U.S. Pat. No. 5,764,807 requires partitioning the wavelet coefficients into a number of lists, with list membership changing as the execution proceeds, and in some cases involving dual membership of a coefficient in different lists. The constantly changing list memberships are difficult and expensive to maintain. Direct implementation of the process unavoidably requires an inner loop of execution that involves the steps "read value and list membership information, compute significance information, derive and output encoding bits, and modify and save new list membership information". The memory to preserve list membership information, the instructions to compute new list membership information, and I/O traffic (bandwidth) to save and retrieve that information, all contribute to process overhead and execution time.

With the above-described protocol, the execution speed of the processing on available DRAM hardware is slow. Implementing the SPIHT process in the manner described in U.S. Pat. No. 5,764,807 for HDTV-rate compression for example, requires memory access rates that are close to the limits of currently available commercial DRAM devices.

Therefore, a need exists for a compression scheme which can execute faster, thus accommodating the size and rate of available memory technology, and yet achieve the SPIHT level of performance.

SUMMARY OF THE INVENTION

It has been realized that more efficient compression may be gained by considering simply the tree structure and the significance values derived from the tree structure. In this conceptualization, lists are not needed. Bits are produced in any order desired, not in the order dictated by use of lists. Trees are traversed and bits are emitted to describe the relative magnitude of coefficients in the sub-trees of the current tree-node, in some appropriate way that is either known to the decoder or that can be derived by the decoder. Rather than accessing each Wavelet coefficient and associated parameters numerous times to generate an output, the invention teaches accessing each coefficient in a predetermined order. All bits emitted by a given node are produced as soon as that node is examined. Advantageously, the encoding itself (i.e., the bits that are emitted as well as the case of emitting no bits until a defined significance is detected) is essentially the same as that used in SPIHT.

In one embodiment, the traversal process produces relevant bits in a given tree before moving on to the next tree, in a scheme of "subtrees first, then siblings". It is more advantageous in certain circumstances to use a traversal scheme in which siblings of the current node are traversed, and thereafter the subtrees down from the current node are traversed. Alternatively, it may be advantageous to encode certain sub-trees only; or choose to refine some subset of nodes based on a variety of criteria, such as precomputed metrics or image subsets of particular interest. Traversal algorithms may be varied, e.g., pre-order and in-order. Variations on the process allow accessing the coefficients only once, or once per bit-plane. A further variation is to separate the produced bits into output queues for further reordering or other processing. For example, it may be of interest to use three output queues dependent in part on whether the current node was already emitting value v bits in the previous plane.

The fact that the magnitudes of the coefficients in the hierarchical tree data organization tend to decrease with depth is exploited by a coding scheme that uses specific definitions of significance for sets of transform coefficients. We define the significance $B(v)$ of the coefficient associated with a node v to be the position of its most significant bit. We similarly define $B(V)$ for a set of nodes V to be the maximum significance of all the nodes in the set. Two of the sets associated with a given node v are of particular interest: the set $D_1(v)$ of all descendants of v, and the set $D_2(v)$ of all grandchildren of v and their descendants. The associated significances $B_1(v)=B(D_1(v))$ and $B_2(v)=B(D_2(v))$ can be precomputed for all nodes in any given tree. The encoding scheme then specifies all bits emitted by a given node v as a function of the traversal of its parents (i.e., the node is reached), the bit-plane b, the coefficient value c of v, the significances $B_1(v)$ and $B_2(v)$, and whether the parent node p still emits $B_2(p)$.

In a further embodiment, pre-computation of $B_1$ $B_2$ is performed; and a bits_emitted_in_given bit-plane counter is added. All required bit-planes are traversed at one time. This reduces the number of nodes accessed in hardware effectively by a factor of 2.

In another embodiment, if $B_1(v)$ and $B_2(v)$ are precomputed, and if the number of bits emitted by a node are counted as a function of the bit-plane, then it can be determined prior to compression where the bit-stream should be truncated. The encoding phase may be accelerated since in this embodiment a tree structure need be read only once.

DESCRIPTION OF THE DRAWING

FIG. 9 is a table measuring performance of the inventive embodiment described in Appendices A and B relative to the SPIHT process;

DETAILED DESCRIPTION OF AN ILLUSTRATIVE EMBODIMENT

The processes to be described can be applied to any data representative of an image. The image or object may be in the form of a TV scan, or alternately a photograph, a digital camera output or a computed image; and can be applied in two or more dimensions. The invention is described first in the context of an end-to-end video system.

Figure 1:
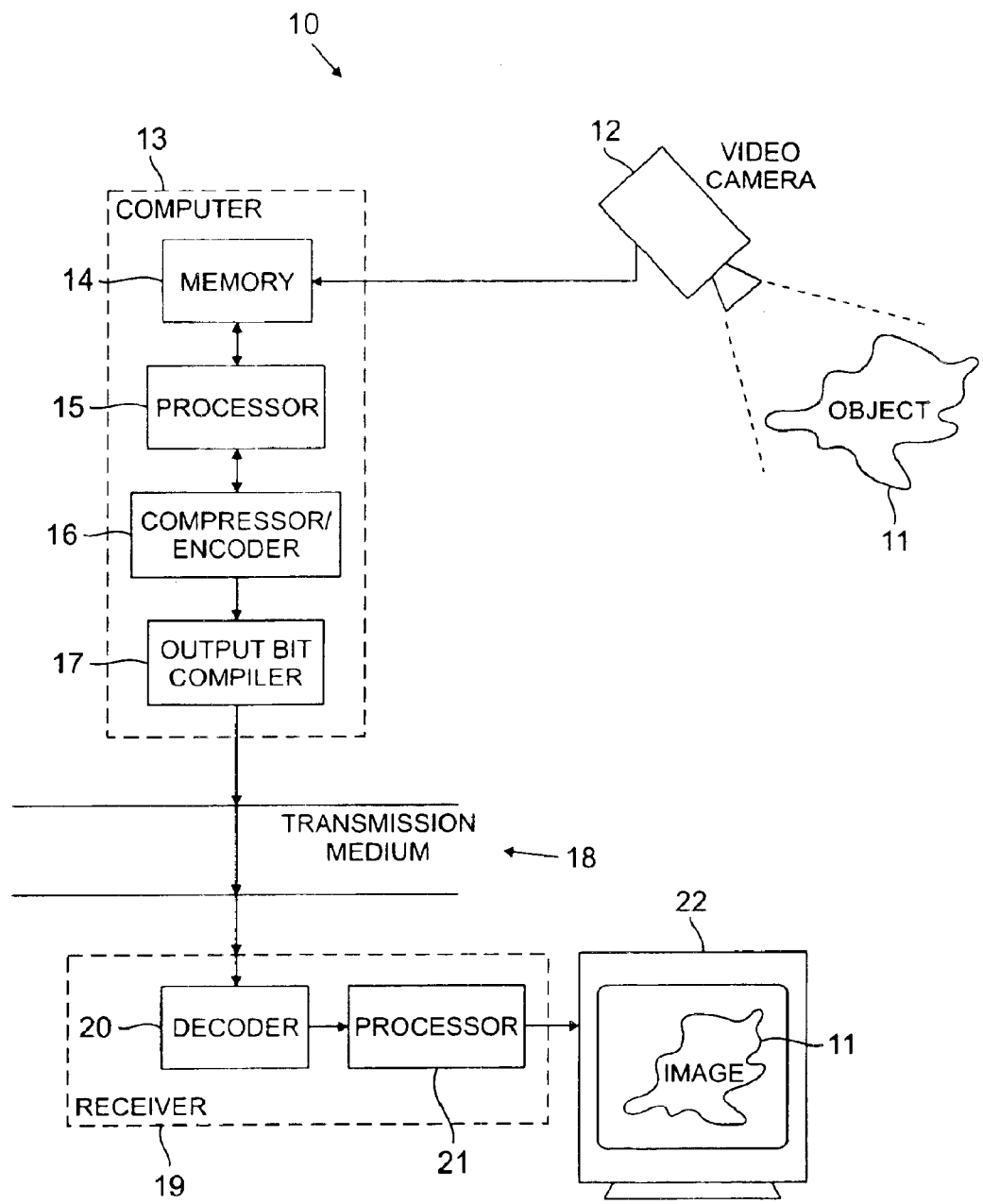
FIG. 1 is a schematic diagram of an end-to-end communication system employing the invention.
Figure 2:
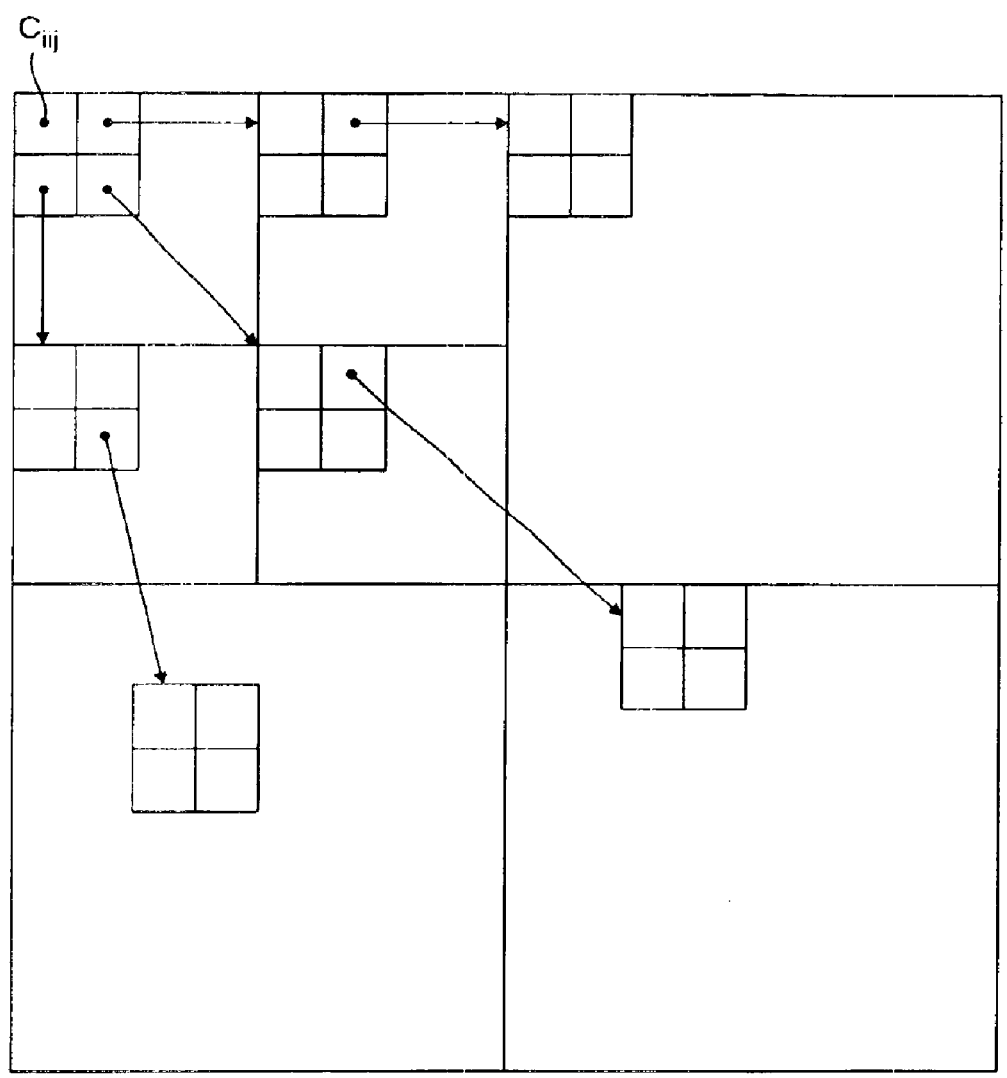
FIG. 2 is a schematic diagram of a data organization showing treeless nodes and nodes with dependencies, depicting the quarternary tree organization resulting from a Wavelet transform.

Referring to FIG. 1, an end-to-end video system 10 is presented by which an original image 11 is acquired by a video camera 12 running a conventional 2-D scan. The scanning generates an uncompressed original set of pixel coordinate values which is coupled to a computer 13 where the coordinates are recorded in a memory 14. A subband decomposition of the memory content is performed in an associated processor 15 resulting in a 2-dimensional array $c_{ij}$ as seen in FIG. 2. Processes for subband decomposition are well-known; an exemplary description is found in U.S. Pat. No. 5,321,776 issued June 1994. The subband decomposition results in a pyramid of matrices and submatrices of wavelet coefficients depicted in FIG. 2. The wavelet coefficients are arranged in hierarchical trees of different levels. A process, operating in computer 13 in the structure denoted compressor/encoder 16, compresses the pixels of the subband decomposition. In accordance with the invention, a novel data traversal and bit-reordering process is performed on the coefficients. The resulting bit stream is sequenced in output bit compiler 17 and transmitted through a transmission medium 18 to a remote receiver 19. There, the bit stream is decoded/decompressed in a decoder 20. The uncompressed original image is compiled and synthesized in processor 21. The reconstructed image is displayed on a monitor 22. Computer 13 must be fast enough to support bit operations. A Sun UltraSPARC™ 60 Workstation with dual 450 MHZ processors may be adapted to run the process. Receiver 18 may be a cable or wireless modem, or a hard drive.

The novel data traversal and bit-reordering processes will next be described.

Data Organization and Significance

The actual data at any pixel must have a distribution that allows tree statistics to be exploited. Trees are composed of nodes (vertices), connected by edges. The number of data items at each position can vary, for example, one data item for gray values or three for color. The precision of the values as determined by the number of bits in the data item may also vary. The number of bits determines the number of bit-planes to be included in the calculation. The algorithm is applied for each value separately. By applying steps of the Wavelet decomposition, a subband matrix of values is created. A bit-plane structure results from the partition into successive powers of m, (typically 2 for a binary language) similar to a partition into thousands, hundreds, tens (for example) of the value range. The pixel data essentially determines a position, and associated value(s), such as grayscale or color for the images. Other data may be attached.

The Wavelet transform naturally results in a hierarchical ordering of Wavelet coefficients (the subband pyramids) into trees, such that the input data dependency of a parent node is identical to the union of the input data dependency of its children.

Thus, for a given wavelet decomposition, a set of treeless nodes (the low-pass filter outputs) are obtained, together with a forest of trees with a branching factor of 4 in the example. Other branching factors may be used including those which are a function of level or subband.

In the hierarchical tree data organization shown in FIG. 2, the magnitude of the coefficients tends to decrease with depth in the tree. This property is advantageously utilized by the encoding scheme. The coding is quantified by the following definitions of "significance" for sets of Wavelet transform coefficients expressed in binary language. (While more general thresholds could be used, a binary decomposition is of primary interest for practical realizations). Given an integer value v, and its binary expansion $$|v| = 2^{b-1} + \sum_{i=1}^{b-1} v_i 2^{i-1}, \quad v_i = 0, 1 \qquad (1)$$

we define the position of the most significant bit to be $$B(v)=b. \qquad (2)$$

Thus, in our definition, bit positions are counted from 1. For a set of numbers V, we similarly define the position of the most significant bit $$B(V) = \max_{v \in V} B(v). \qquad (3)$$

For simplicity, we further define $$B(\emptyset)=0. \qquad (4)$$

For the Wavelet coefficient hierarchical trees, two sets are of particular interest: the set $D_1(v)$ of all descendants of a particular node v, and the set $D_2(v)$ of all grandchildren and their descendants of a particular node v. These are denoted by:

$$B_1(v)=B(D_1(v)), \, B_2(v)=B(D_2(v)). \qquad (5)$$

Accordingly, we define the significance of a coefficient v to be the bit-plane b such that $B(v)=b$, and similarly, the significance of a set V to be the bit-plane such that $B(V)=b$.

Significance Encoding

Figure 3A:
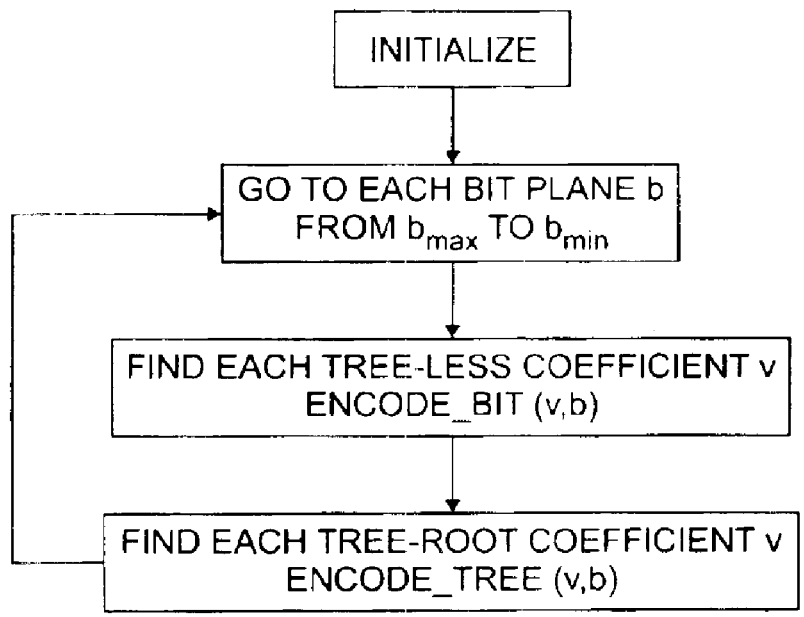
FIG. 3a is a flow chart exemplifying traversal of all tree-less nodes and all trees in a predetermined order.
Figure 3B:
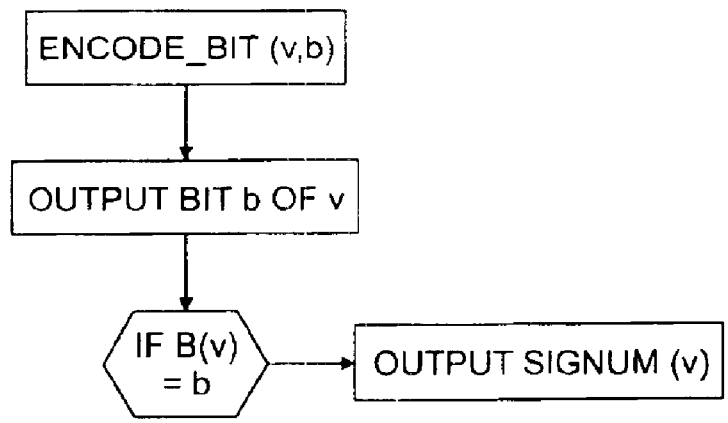
FIG. 3b is a flow chart showing emission of part of a wavelet coefficient value for the current bit-plane.

The compression achieved by the processes of the present invention results from traversing the trees of FIG. 2. From the traversal, emitted bits are generated which describe the relative magnitude of coefficients in the sub-trees of the current node v. It is advantageous that the significance encoding herein described is consistent with the "zero-tree" encoding of SPIHT. Referring now to the flowchart of FIGS. 3a and 3b, and to the process statements in Appendix A, encoding bits are produced at nodes in a tree as a function of the significances defined for the node, a given bit-plane b, and whether the parent node still emits $B_2(v)$ bits. Given a bit-plane b, we emit a bit 0 if $0<B_1(v)<b$, and a bit 1 if $B_1(v)=b$. In the first case, all coefficients in the sub-tree of v have a bit 0 in bit-plane b, and need not be further described. In the latter case, at least one coefficient in the sub-tree below v is significant, and further information is required. Practically, it may be necessary to establish a bit budget for traversing the image as a whole or for a given subtree or based on some other cut-off or a figure of merit. Once the budget has been reached, no further encoding need be carried out because of the "embedded" property at work. The result of the process of FIGS. 3a and 3b is a single output stream of bits of values 1,0, depending on results of the significance tests. The nodes are traversed one bit-plane at a time. The minimum bit-plane $b_{min}$ is not necessarily the lowest bit-plane, but rather the bit-plane reached when the output bit budget is reached. The encoded bits are transmitted to the remote receiver 19 where they are uncompressed/decoded.

In FIG. 3b, the output is a coefficient value for the current bit-plane. As will be shown below, the output may include additionally or alternatively: queueing certain output bits into one or more stores for additional processing, outputting the parent $B_1$ value, ot outputting the signum and magnitude bits separately.

Figure 4:
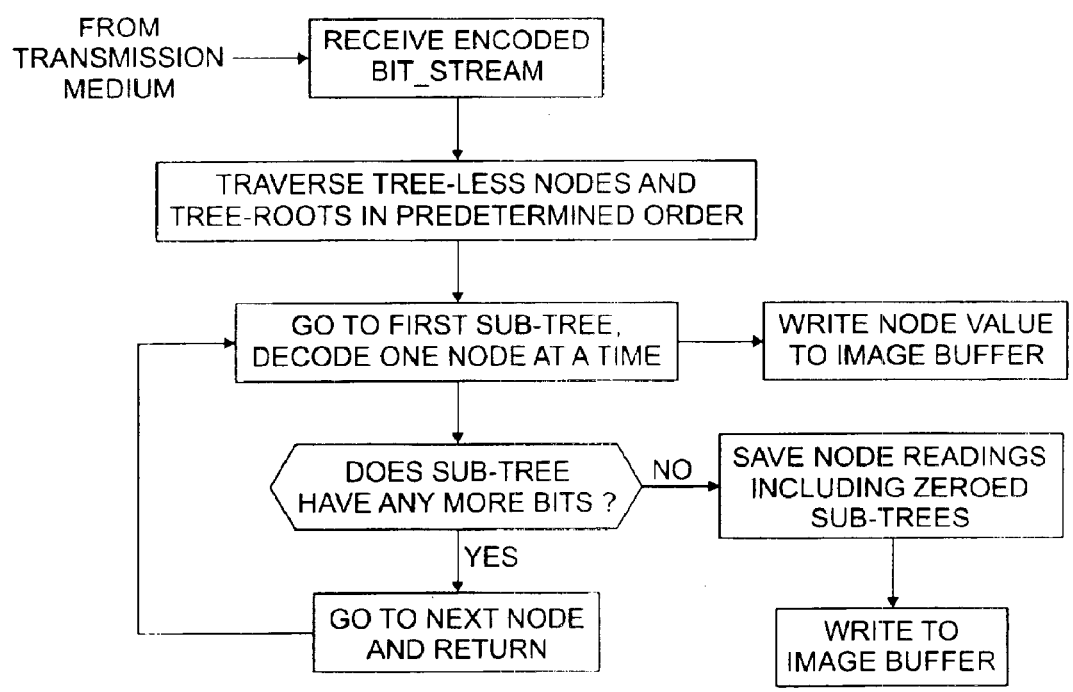
FIG. 4 is a flowchart of a parallelized version of the decoder for the basic process.

Decoding is essentially the inverse of encoding; and is achieved in decoder 20 by reconstructing the significances and the coefficient values. The objective is to not write any nodes until all their bits are known. As shown in FIG. 4, the encoded bit-stream is received and a traversal of treeless nodes and tree roots is effected. Then, in a sequence, a first subtree decoded, one node at a time. If the subtree is found not to be significant at any of the available bit-planes (i.e., when the data has been exhausted or the subtree still has significance 0 in bit-plane 1) it is zeroed. Trees with significance in any bit-plane may have the next bit-plane set to an average value or to zero.

The resulting node readings, including zeroed nodes, are saved. The array is inverse-transformed in decoder 20 to recover the original image. This process then repeats for further subtrees and nodes. If all bits from a given node cannot be examined in one operation, then partial results may be saved and re-read as illustrated FIG. 8, hereinafter.

The above processes very efficiently encode the relative magnitudes of the coefficients in a tree. The values associated with child nodes of a node v must be transmitted explicitly for all bit-planes such that $B_1(v) \geq b$.

Data Traversal And Bit Reordering

The encoding scheme described above specifies all bits emitted by a given node v as a function of the bit-plane b, the associated coefficient value v, the significant bit positions $B_1(v)$ and $B_2(v)$, and the parameters of the ancestors of the node. That is, if the node emits bits it either emits $B(v)$ bits only, or all bits—depending on the ancestor parameters. It therefore is inherent that the computation of these bits may be performed in parallel. Further, the user may elect, for example, to encode certain sub-trees only; or choose to refine some subset of nodes.

As noted, decoding is achieved by reconstructing the significances. This imposes some restrictions on bit order: the decoding process must reconstruct $B_1(v)$ before specific bits of the children of v can be identified; and must reconstruct $B_2(v)$ before further sub-tree information can be processed. Further, for any given node, bit-plane information must be obtained in order, from highest bit-plane to lowest. Advantageously, given these conditions, this class of algorithms can be embedded.

Different data-traversal algorithms in the encoder will produce the encoded bits in different orders. As earlier noted, the simplest and usually preferred method is to traverse the treeless nodes and the trees in a predetermined order, one bit-plane at a time, with the recursive process of Appendix A.

Figure 5:
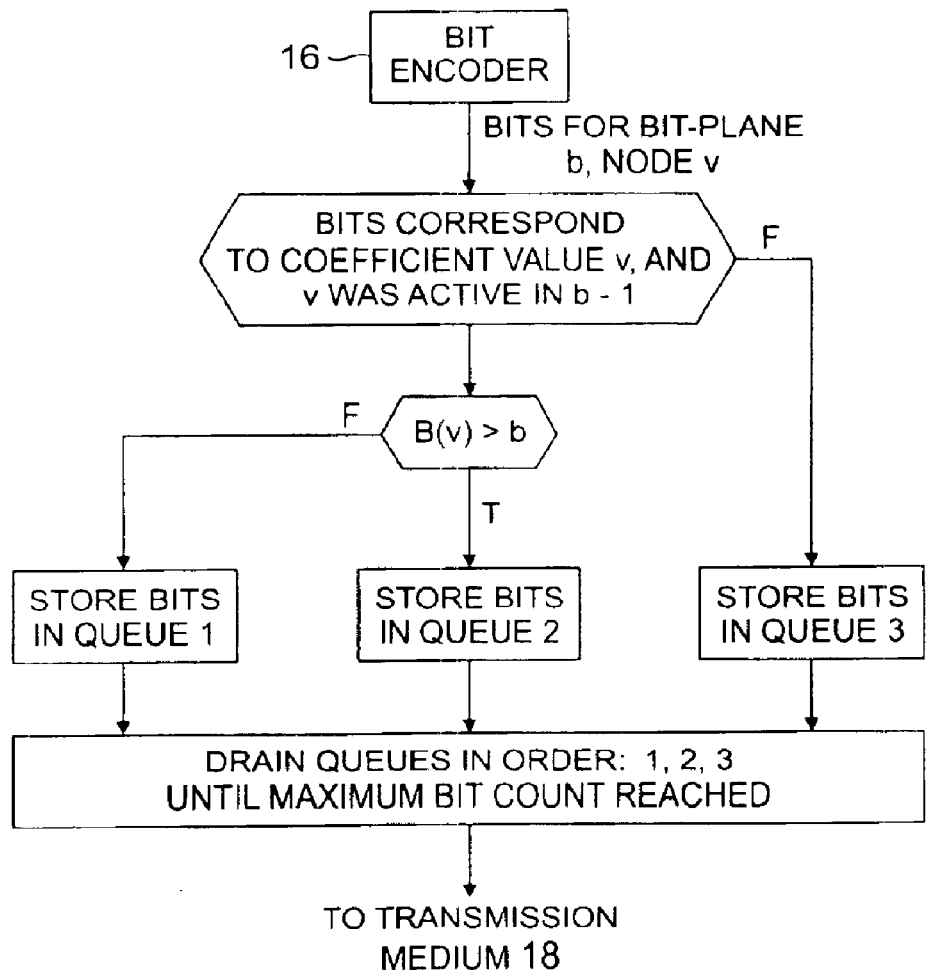
FIG. 5 is a schematic diagram showing an exemplary post-processing operation.

Since the origins of bit encoder outputs are readily identified, further processing based on the characteristics of the bits is readily accomplished. Of particular interest is a postprocessor that delimits the bit-planes as, for example, by prepending a bit-count to each bit-plane queue, or by using arithmetic coding on each bit-plane stream and terminating each with an end of symbols marker. A postprocesssor used to reorder the bit-encoder output stream is shown in FIG. 5. A division is made of the bit-stream in a given bit-plane b into three bit groups, based on: a) whether the bits correspond to coefficient value bits for nodes v that were active in the previous bit-plane, in which case these bits are directed to output storage queue 1 if B(v)=b, or if not these bits are directed to a output storage queue 3; and b) directing all other bits to output queue 2. On final output, the queues are drained in numerical order, with a cut-off applied when a pre-established maximum bit count is reached.

Figure 6:
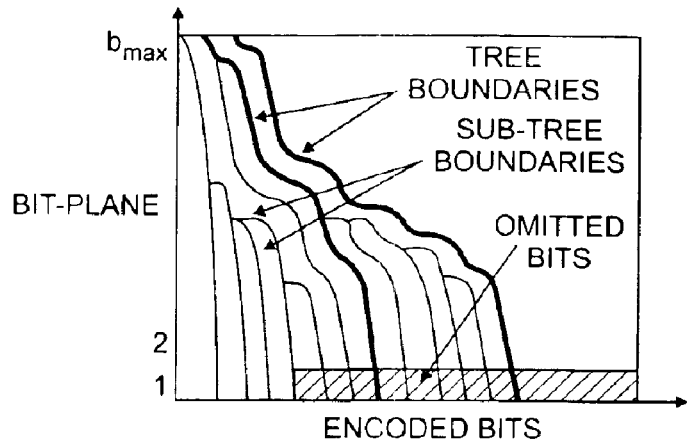
FIG. 6 is a diagram illustrating originating nodes for bits in encoder output stream as a function of bit-plane and bit number of reference.

In order to support alternatives to emitting bits in the order in which they are generated, it is sometimes useful to bound the outputs generated, as illustrated in FIG. 6 and in the description below. For the particular decoder described in Appendix B, for example, it is necessary to convey bit-plane boundaries to the decoder.

For a tree of S levels and branching factor 4, we have a maximum bit count $C_b$ in bit-plane b given by:

$$C_b \le \frac{4}{3}(4^S - 1) - 2 \cdot 4^{S-1} - 4^{S-2} \text{ bits}, \tag{6}$$

a bound reached when each node emits a sign bit, a value of the bit in the current bit-plane, a $B_1$ bit and a $B_2$ bit. (The negative terms in Eq. 6 account for the fact that nodes in the next to last layer do not emit $B_2$ bits, while nodes in the last layer of the tree emit neither $B_1$ nor $B_2$ bits.)

Across all bit planes, each node emits only one sign bit, and emits $B_1$ and $B_2$ bits only once for the maximum count to be reached. Thus, with K bits per node, a tree emits at most $$C \le \frac{4^S - 1}{3}(K+3) - 2 \cdot 4^{S-1} - 4^{S-2} \text{ bits}. \tag{7}$$

The bit-plane boundary marking may be implemented in the output queues by preceding transmitted bits with a bit-count however encoded; or by further encoding the outputs and followed by an end-of-bit plane marker.

Figure 7:
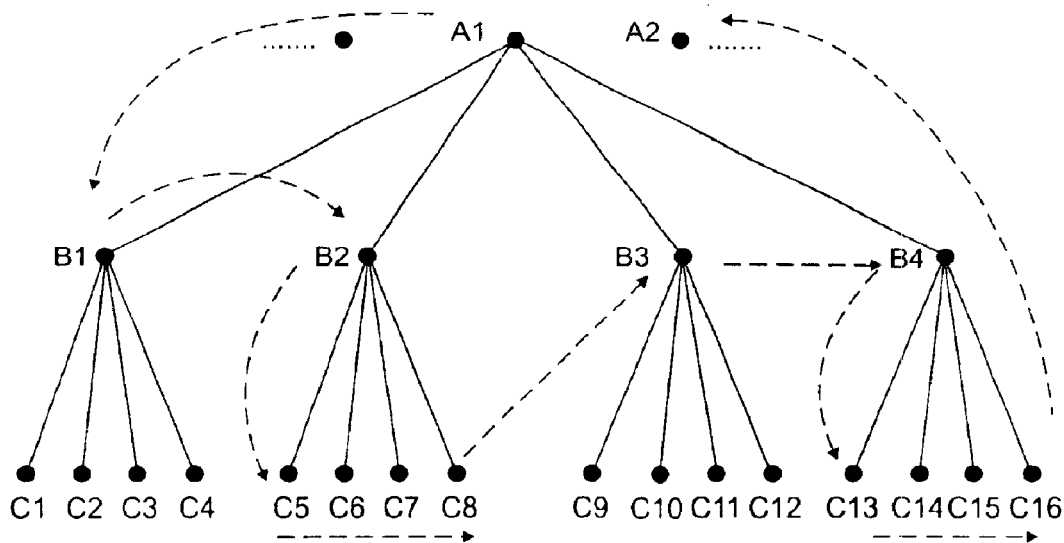
FIG. 7 is a process sequencing diagram characterizing traversal by "siblings first, subtrees next"

The reference process shown in FIGS. 3a, 3b and expressed in recursive form in Appendix A, is a "depth-first" traversal scheme in which all nodes of a given tree are traversed and then sibling trees of the given node are traversed. An alternative traversal scheme, which is presently preferred for its advantages given current DRAM hardware, is exemplified in FIG. 7 where the sibling nodes B1, B2, B3, B4 are children of node A. The nodes C1, C2, C3, C4 are a four-tuple children set of node B1; and likewise, the nodes C5–C8, C9–C12, and C13–C16 are respectively four-tuple children sets of nodes B2, B3, B4. With the current node being node A1, a transition is made to examine in sequence the Wavelet coefficients and significances of nodes B1, B2, B3, B4. The emits from this traversal are collected and queued. With traversal of the sibling nodes B1–B4 complete, the process returns to traverse in sequence the nodes C1–C4, C5–C8, C9–C12, and C13–C16 as required by the significance test results for node B1 in the example. Rather than re-reading these parameters and re-deriving the required traversal sequence, corresponding state bits are maintained on a Stack, with bits pushed as a result of the tests performed, and "popped" when a transition between nodes is effected. The emits from this step are collected and queued.

The preceding operations require a Stack to maintain the necessary state variables. Thus, for further example, the Stack retains node A1 environment during the examining of the wavelet coefficients of the sibling nodes B1–B4. The Stack entry pushed as part of the A1-to-B1 transition must encode a transition (pointer) to node A2 as the next operand.

Similarly, for example, the Stack retains a pointer to node B3 at the time the B2 environment is pushed onto the stack in order that the "POP" operation, after processing of node C8 is completed, returns "A1" parent parameters and node B3 as the next operand. When the descendents of the last member of a 4-tuple are examined, a special rule applies. For example, in the B4-to-C13 transition, the Stack is not pushed, but the parent state memory is gated to reflect B4 status as the nodes C13–C16 are examined. The "POP" operation following completion of examination of node C16 returns the operand A2 and its environment; and the traversal process is continued.

Figure 8:
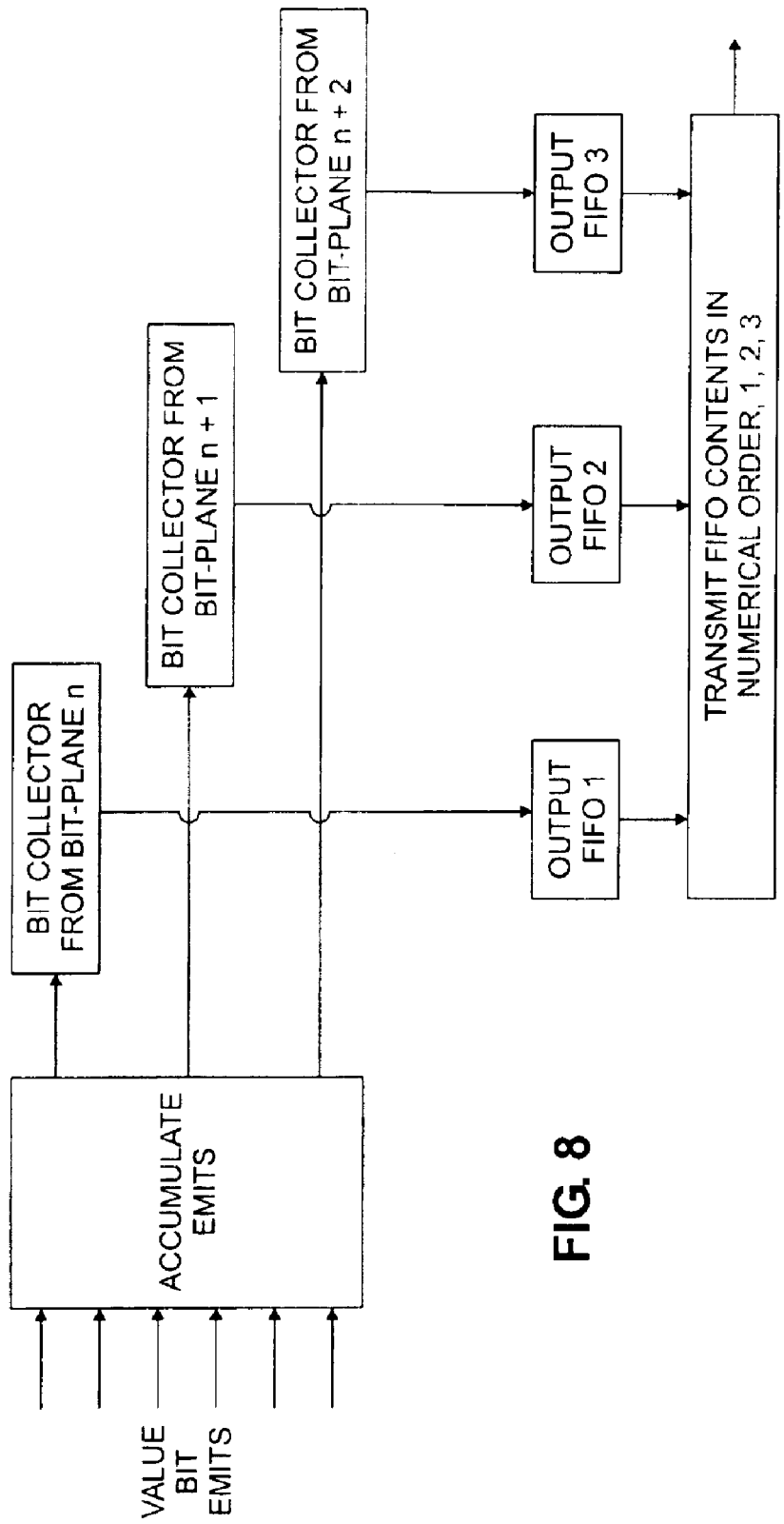
FIG. 8 is a flow chart of an alternative traversal in which a bit output collector collects emits as a function of bit-plane number.

A useful alternative, shown in FIG. 8, to emitting bits in the order in which they are generated, is to put bits into appropriate output FIFOs (e.g., one FIFO per bit-plane), and to drain the output FIFOs in order. Specifically, the bits are reordered by writing them into different output FIFOs, wherein explicit value bits go to FIFO b if B(v)=b. The FIFOs are drained in numerical order, one bit-plane at a time until some predetermined bit budget is reached. Input FIFOs at the receivier 19 or their functional equivalent, for example, transmitted bit-plane boundary information, are required to receive the outputs. The transmission may occur as soon as all bits in a given bit-plane have been produced (here, prepend a bit count); or as soon as bits are produced (here, append a bit-plane boundary marker).

A further use of reordering the bits emitted is to exploit the data statistics further (e.g., significances in a sub-band or signs in a subband), by applying, for example, arithmetic coding to different parts of the LIFTS encoder 16 output. A straight-forward realization is to encode subbands and signs separately.

Decoder Implementation

Given the particular algorithm chosen to run the processes of encoder 16, it is of interest to analyze the location of the bit data within the bit stream emitted. For the reference process of Appendix A, for example, the bits for every tree are emitted in turn, one bit-plane at a time. For lower bit-planes, previously active nodes will continue to emit bits, while new nodes may add bits in turn.

Since the traversal algorithm is predetermined, and since values of the parent nodes determine whether (and at what bit-plane) children start contributing, it is readily appreciated that individual nodes may be reconstructed completely, one at a time, to the extent that bits are available. The decoder process is essentially the inverse of the encoder process depicted in FIGS. 3a, 3b. By way of example, at the encoding stage, trees are traversed and output bits are encoded one bit-plane at a time (as by looking at each active node once per bit-plane). At the decoder, however, trees may be reconstructed at one node across all bit-planes at a time. This approach obviates need to save partial results; and is the scheme followed by the decooding process stated in Appendix B.

An alternate decoding process to the exact inverse of the Appendix A encoding as is described in Appendix B, requires knowledge of the bit-plane boundaries in the encoded stream. Bit-plane boundary information may be obtained, for example, by having the Appendix A outputs written to a holding area (e.g., a queue), and sending appropriate queue boundary information together with the queue contents once the processing of the bit-plane is complete. FIG. 8 illustrates how this process may be implemented. Bit emits are accumulated, and then separated into sets depending on the bit-plane of origin. The separated bits are stored in output FIFOs, which are drained in order from the highest bit-plane to the lowest through a "decode bit-plane boundary" process.

While the output of encoder 16 may be generated by examining individual nodes in the trees (read-only access), the decoder 20 may require both read and write operations to retrieve and save partially reconstructed values as the algorithm proceeds. However, if the process of FIG. 8 is used, it is not necessary to read partial results: coefficients may be constructed and saved all at once.

Rather than looking at the sub-trees of each child of v and emitting $B_1(v)$ bits accordingly, additional compression may be achieved by first attempting to aggregate all indirect descendants of v, in the manner practiced by the SPIHT process. Once the sub-tree of v has been found to be significant in accordance with the processes of FIG. 3, (namely if $B_1(v) \geq b$,) we emit a bit 0 if $0 < B_2(v) < b$, and a bit 1 if $B_2(v) = b$. While this step may be repeated with aggregates of more remote descendants, it is equally effective to have child nodes emit bits describing their sub-trees (i.e., emitting $B_1(.)$ bits) once $B_2(v) \geq b$.

FIG. 9 is a table comparing PSNR values achieved in tests of the SPIHT and LIFTS reference algorithms. The two processes transmit identical information (only the ordering of the bits is different); and hence achieve identical performance at bit-plane boundaries. With random cut-off points, the reference algorithm suffers a slight performance degradation compared to SPIHT. The test set of 26 HDTV and 6 SDTV color images showed an average loss in PSNR of 0.38 dB for a six step non-standard Wavelet decomposition and a compression ratio of 8:1. LIFTS achieves this performance at greatly reduced computational complexity, greatly reduced memory requirement and reduced data access overhead since the lists have been eliminated, and all output bits for a given coefficient are produced as soon as that coefficient is examined.

Accelerating Encoding by Precomputing $B_1(v)$ and $B_2(v)$, and Predetermining Point in Tree Traversal for Stopping In the next example, a variation of the invention is taught in which the tree structure need be read only once, with the result that the encoding phase may be greatly accelerated. In this embodiment the user can predetermine the coefficient, bit-plane and specific bit at which the algorithm will halt if a bit-budget or cap is placed on the total number of bits to be emitted.

Given a particular data tree (of signed magnitude integers), let v be the root node of some subtree. We precompute two coefficients associated with v. Let $B_1(v)$ be the highest bit-plane in which any descendant of v has a non-zero bit (i.e., is significant). Similarly, let $B_2(v)$ be the highest bit-plane in which any indirect descendant (grandchild and beyond) becomes significant. The bit-plane B(v) in which the coefficient v becomes significant need not be stored since it can be obtained from the coefficient. If no data in a subtree are significant for a given bit-plane, all coefficients in the subtree are still best approximated by zero, and can be described with a single bit.

Figure 12:
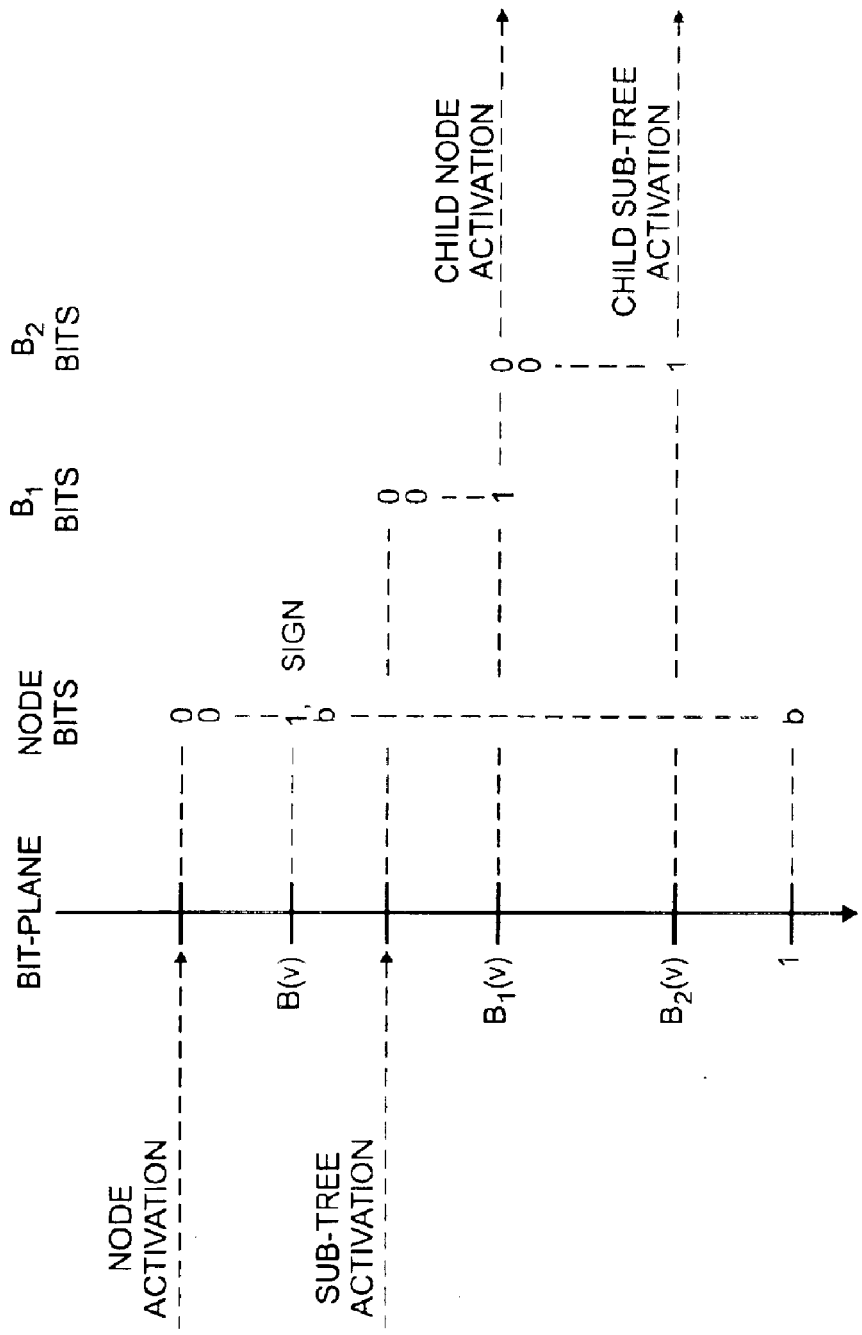
FIG. 12 is a diagram illustrating node activation and bits emitted by a node as a function of the bit-planes B_x.

FIG. 12 shows the bits emitted at a given node v. It can be seen clearly that 1) all bits emitted by a given node are determined a priori by the coefficients v, B(v), B1(v), $B_2(v)$ and the coefficients $B_1(p)$, $B_2(p)$ of the parent node p of v, independent of the traversal order of the trees. Bits can therefore be computed in parallel for individual nodes or for trees. A second observation of importance is that the number of bits emitted by the node is thus specified, and can be computed as a function of bit-type and or bit-plane a priori.

Besides enabling the user to readily specify sharp bounds on the maximum number of bits emitted for a given bit-plane (e.g., for a given bit-plane, or a given tree), these observations allow the user to predetermine the coefficient, bit-plane and specific bit at which the algorithm will halt given a budget on the total number of bits to be emitted, as well as grouping of nodes and bit-planes which may aid in post-processing compression.

By precomputing $B_1(v)$ and $B_2(v)$, and concurrently by counting the number of bits emitted by a node as a function of the bit-plane, it can be determined prior to compression where the bit-stream should advantageously be truncated. Counters can be updated as part of the computation of the B parameters. This allows a reduction of the required memory reference rate by a factor of 2 or more. Extracting all of the bits, or alternatively all bits from groups of bit-planes that a given coefficient will contribute to the compressed image, is achieved while using at most a single memory reference.

Figure 10:
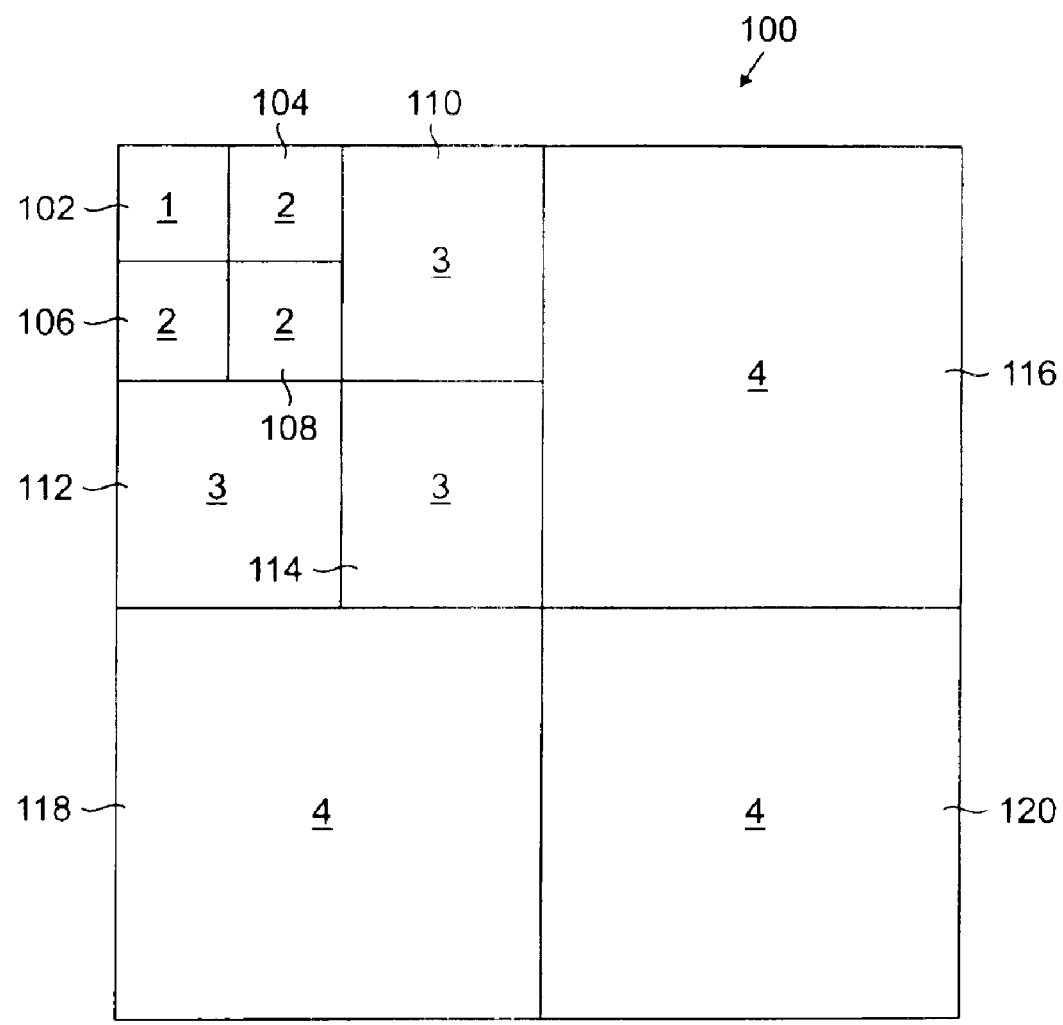
FIG. 10 is a diagram showing wavelet decomposition into trees.
Figure 11:
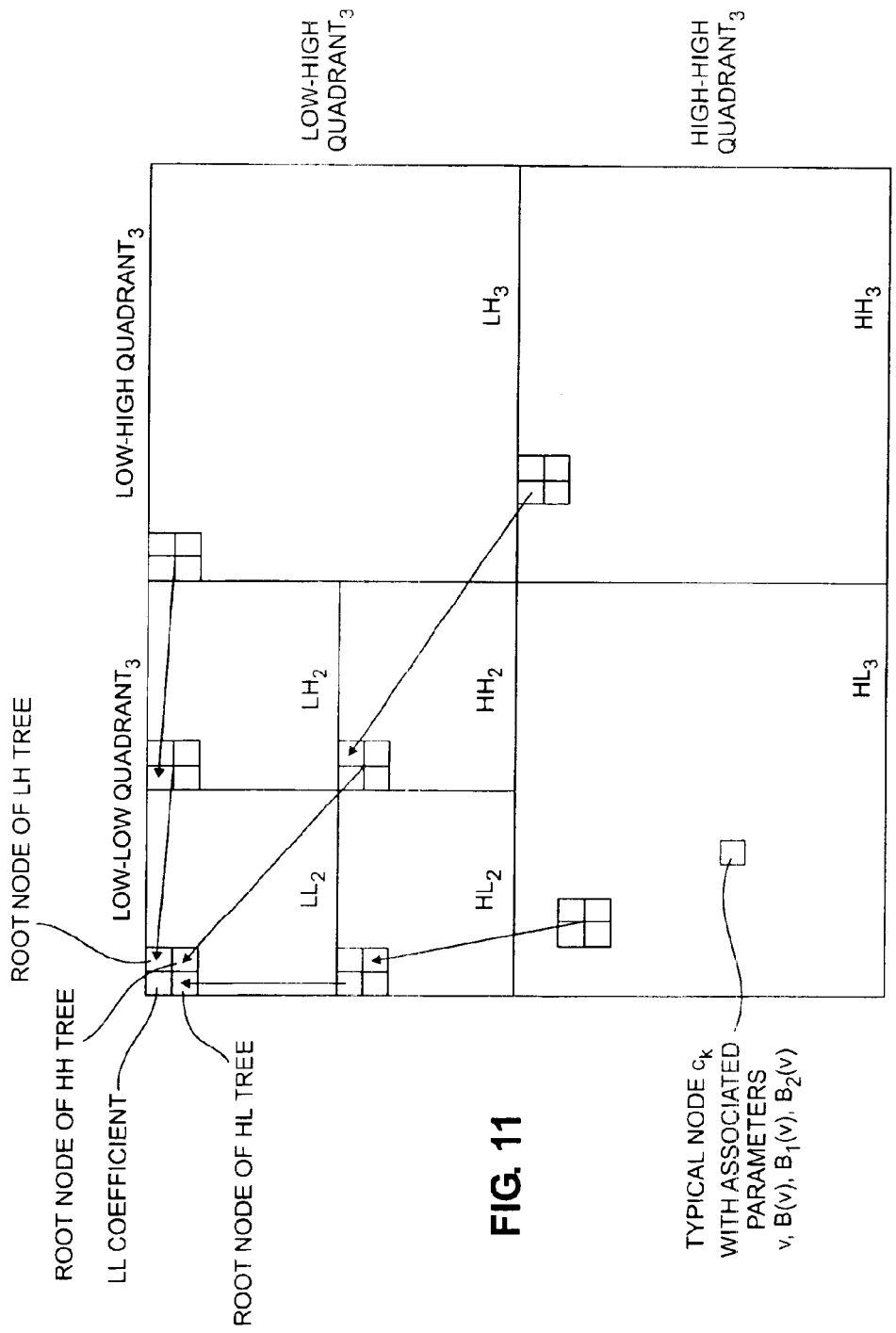
FIG. 11 is a diagram illustrating data dependency in tree structures such as in FIG. 10.

Referring to FIGS. 10 and 11, it is seen that with every coefficient c in the low-low quadrant of a given step, there are the corresponding coefficients $c_k$ in the high-low, low-high and high-high trees, together with their associated $B_1(c_k)$ and $B_2(c_k)$ values, respectively. The computation of the parameters $B(v_k)$, $B_1(v_k)$ and $B_2(v_k)$ of the parent tree node $v_k$ of the nodes $c_{ki}$ may be carried out "on the fly", as $v_k$ is computed from the corresponding low-low quadrant $c_k$. Thus for example, given $B(c_{ki})$ and $B_1(c_{ki})$ for each child $c_{ki}$ of a node $v_k$, we have:

$$B_2(v_k) = \max_i (B_1(c_{ki})), \qquad (8)$$

$$B_1(v_k) = \max_i (B(c_{ik}), B_2(v_k)).$$

The recursion relationship in Eq (8) allows the efficient computation of the required parameters.

After applying the first step in the Wavelet transform, the result is four different sets of coefficients, each the size of a quarter of the original image. Each of these sets is obtained by a filter/decimate operation. There are two filters: a high-pass and a low-pass filter—denoted H and L). The filters operate in two directions: the X direction and the Y direction.

A particular 2-D Wavelet transform is next described. Filters H and L are run in the X direction; and the results are stored by splitting the square down the middle, the L outputs to the left, the H outputs to the right. [L|H] Next, the same H and L filters are run on the result of the preceding operation, but now in the Y direction, the L results on top, and the H results below. The image now is split in two in the other direction. The input L block yields LL and HL, while the input H block yields LH, and HH, organized as:

LL LH

HL HH

The blocks that have an H in them are final, i.e., are part of the tree. The LL block becomes a new input. The process is run again, splitting the LL block in 4. The process recurses on the new LL block for the number of steps required, but no more steps than supported by the data. It is necessary to know the node identity but not necessarily where its information is stored.

Another exemplary 2-Wavelet transform involves transforming in the X-dimension only: picking the resulting L region and divide it with XY transforms as before. What all schemes have in common is that they result in a tree structure—some tree structures being regular and some not in that some nodes have fewer or more descendents. The methods described are the same irreggardless.

FIG. 10 illustrates more broadly the partitioning of an exemplary block 100 of wavelet coefficients into blocks 4 of nodes corresponding to the outputs of the first step wavelet decomposition by applying the HH, HL, LH and LL filtering operations. The results are stored in blocks 120, 118, 116 and the combined area of 102, 104, 106, 108, 110, 112, 114 respectively. The next decomposition step subdivides this combined block in the same way, similarly yielding HH, HL, LH coefficients in the blocks labeled 3, and LL coefficients in the remaining combined block 102, 104, 106, 108. The next step in the decomposition again applies to this combined area further subdividing it into the blocks labeled 2, and the new LL result in the block labeled 1.

In FIG. 11, the top left set of 2×2 squares contain the following nodes:

coeff_LL, top_node_of_LH_Tree top_node_of_HL_Tree, top_node_of_HH_Tree

Each of the tree nodes has associated with it a coeff (coeff_LH, coeff_HL and coeff_HH),as well as the coeffs (B_1_LH, B_2_LH) for coeff_LH, (B1_HL, B_2_HL) for coeff_HL etc.

Coeff_LL does not have a tree associated with it.

For any root node, the quantities from which the coefficients arise, are one quadrant over (to the right for LH, down for HL, diagonally for HH), and are twice the original size.

It is seen that any one (1×1) coeff and associated parameters in the tree comes from the (2×2) square in the lower quadrant as the following summarizes:

1×1 (from top leftmost quadrant)

|

2×2 (from the next quadrant out)

|

4×4 (from the next further quadrant out)

|

16×16 (etc)

A subtree activation occurs in a particular bit-plane. With the "activation" or state change of a node, the descendant node acquires the responsibility to describe itself, and determines if it can describe its descendants; or if not, then instructs them to describe themselves. These state changes occur at the bit-planes defined earlier.

The bit-planes are stacked in a hierarchy from ones containing most significant bits to those with least significant bits. The encoding scheme executes by "starting from the top", that is, starting at the root node and conceptually in the top bit-plane and working down to more and more significant digits, descending in the trees as far as necessary until it is determined that to current approximation, i.e., bit-plane, everything below is zero.

Figure 17:
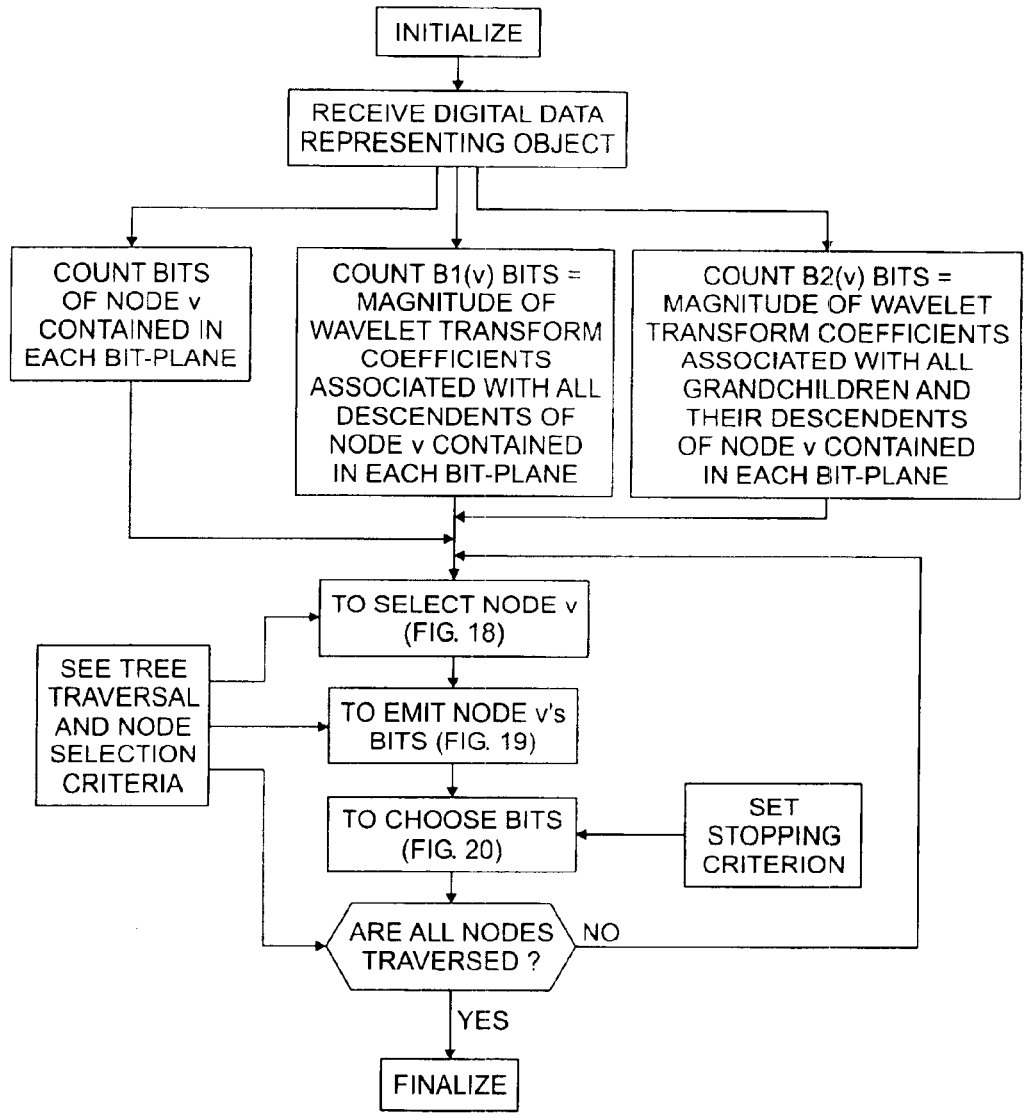
FIG. 17 is a flowchart illustrating steps of an accelerated encoding scheme.

FIG. 17 describes in flowchart fashion the processing. After initialization, data representing an object such as an image is subject to the Wavelet transform. Bit counts are made on certain selected data in the tree structure resulting from the transform. The bits of a node v contained in each bit-plane are counted. $B_1(v)$ bits representing the magnitude of Wavelet transform coefficients of all descendents of node v contained in each bit-plane are counted. $B_2(v)$ bits representing the magnitude of Wavelet transform coefficients of all grandchildren and their descendents of node v contained in each bit-plane are counted. Tree traversaal, node selection and bit-count stopping criteria are set. Then, a node is selected; that nodes' bits are emitted, and the bits are chosen. If all nodes that are required to be traversed are traversed, the process finalizes. If not, the process returns to selection of another node.

Figure 18:
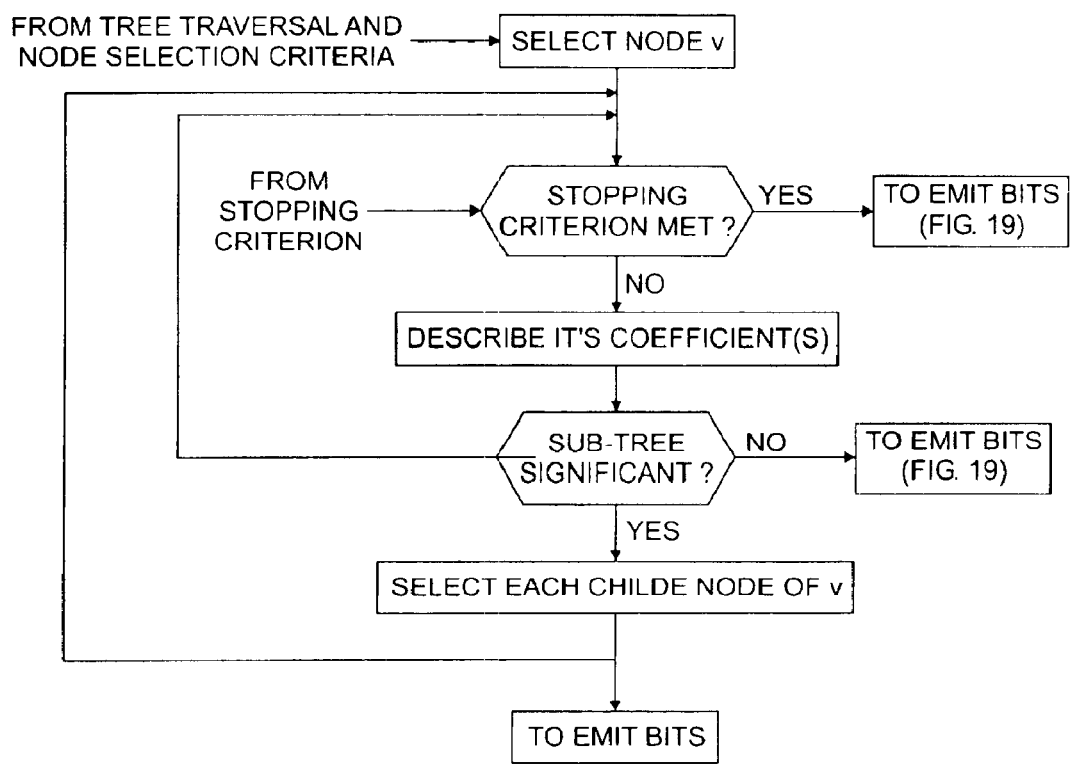
FIG. 18 is a flowchart showing further detail of the accelerated encoding scheme.
Figure 19:
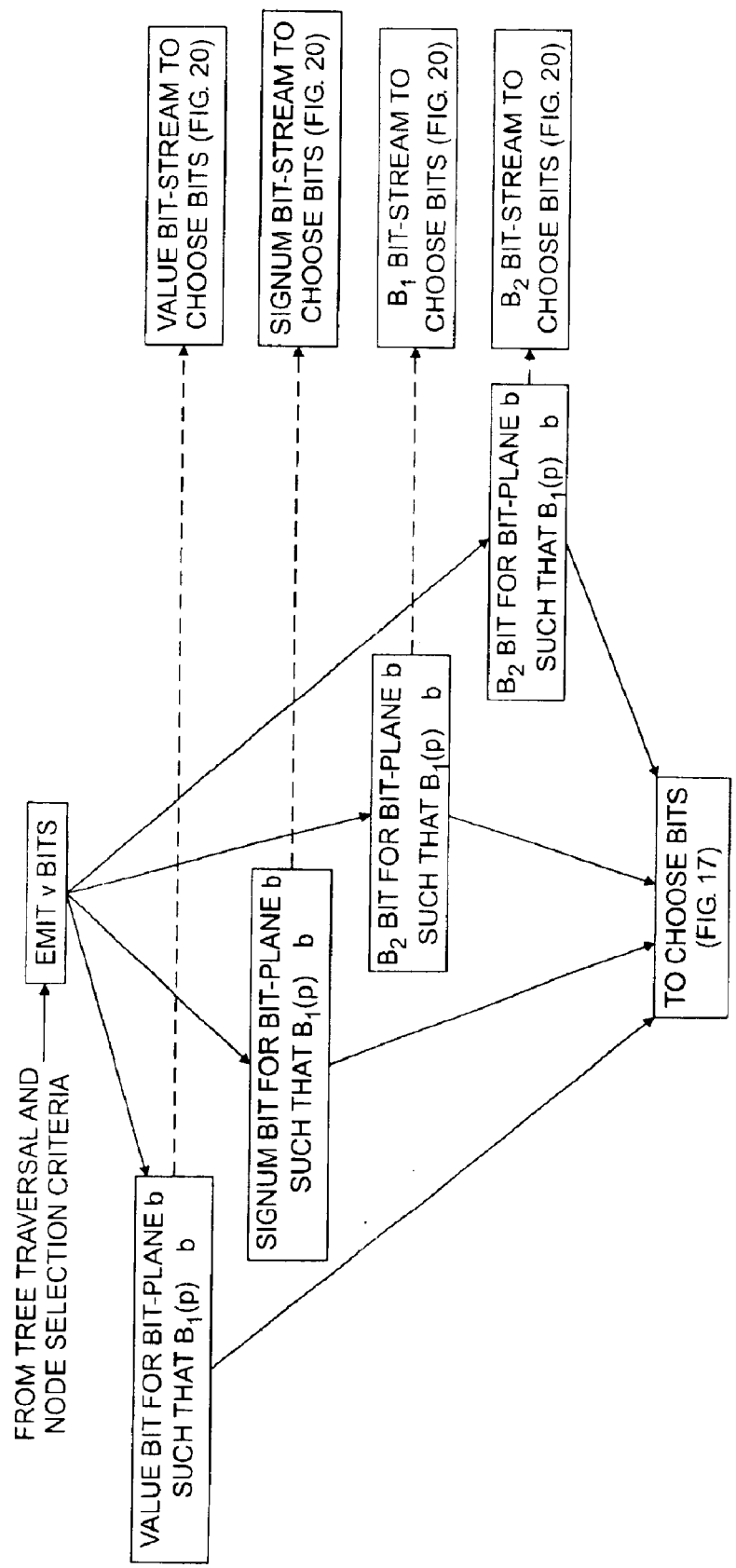
FIG. 19 is a flowchart describing emission of valoe, signum, $B_1$ and $B_2$ bits furing the acceleraed encoding.
Figure 20:
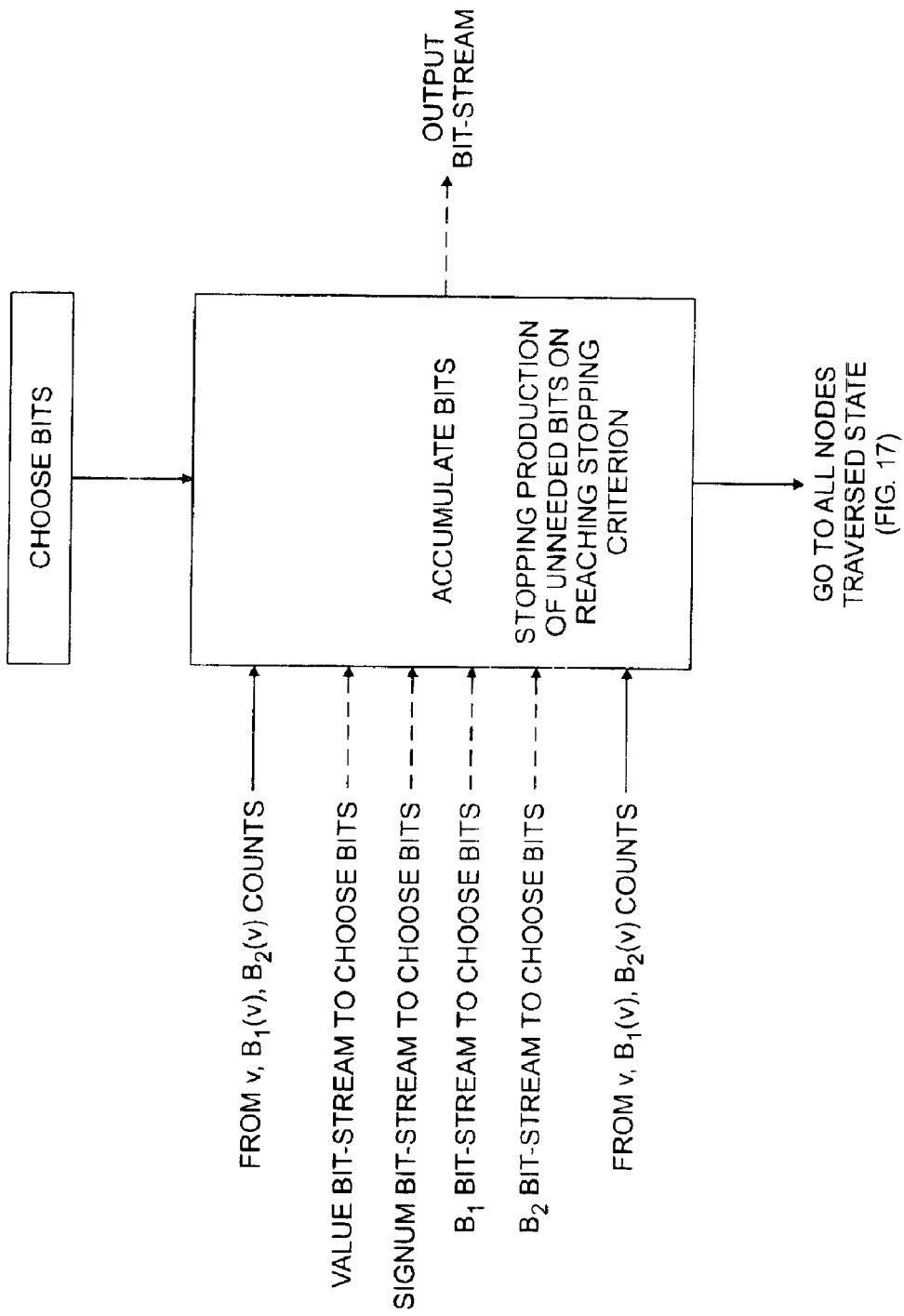
FIG. 20 is a diagram of a bit accumulator for practicing the accelerated encoding scheme.

FIG. 18 flowcharts the process within the select node step of FIG. 17. FIG. 19 flowcharts the porcess within the emit node's bits step of FIG. 17. FIG. 20 is a further description of the process whereby bits are accumulated.

Returning to FIG. 12, in addition to illustrating the bits emitted by a single node as a function of the bit-planes $B_x$, FIG. 12 further illustrates what occurs when a particular bit-plane is reached. At the very top of the tree, the node activation occurs for the top-most bit-plane, for example, the ten-thousands. A variation is to "push" node activaton down if possible, by first looking at all the root nodes of the tree and checking which partition or bit-plane the maximum occurs in. If the maximum occurs in a lower, bit-plane (similar to, say the thousands), then search for -thousand-.

Nodes lower in the tree are activated when the algorithm comes to a node and inquires: is there a coefficient in the sub-tree below that node which is large enough to fall in the current bit-plane? If yes, then each child of the current node is activated.

In essence, an active node is instructed to:

(a) describe its own coefficient;

(b) If nothing below the active node is large enough (i.e., everything below is still zero up to the current approximation—the thousands), stop the inquiry;

(c) otherwise: make all children of the node active, and describe their coefficients;

(d) describe all indirect descendants in the aggregate: if they are zero to the current approximation, stop the inquiry;

(e) otherwise: instruct the children of the current node to describe their children as well.

Referring again to FIG. 12, the number of bits emitted by the node in a given bit-plane is seen to be as follows:

Emit a value bit for bit-plane $b$ such that $B_1(p) \geq b$

Emit a signum bit for bit-plane $b$ such that $B(v) = b$

Emit a $B_1$ bit for bit-plane $b$ such that $B_2(p) \geq b \geq B_1(v)$

Emit a $B_2$ bit for bit-plane $b$ such that $B_1(v) \geq b \geq B_2(v)$. (9)

For a fixed bit-budget, the final bit-plane can therefore be determined by maintaining a count of the total number of bits generated as a function of the bit-plane. Since these counts can be determined during the computation of the $B_1(v)$ and $B_2(v)$ parameters in encoder 16, i.e., as part of the wavelet transform computation, the encoder need not generate any bits that will not actually be used. Thus, all bits from a given node may be generated as soon as the node is accessed. The last bit emitted does not fall on a bit-plane boundary in general. Nodes will emit bits up to and including the ending bit-plane be until the total allowed bit-count in this last bit-plane is reached. For all subsequent nodes, bits are emitted up to and including the bit-plane $b_e+1$.

Figure 13:
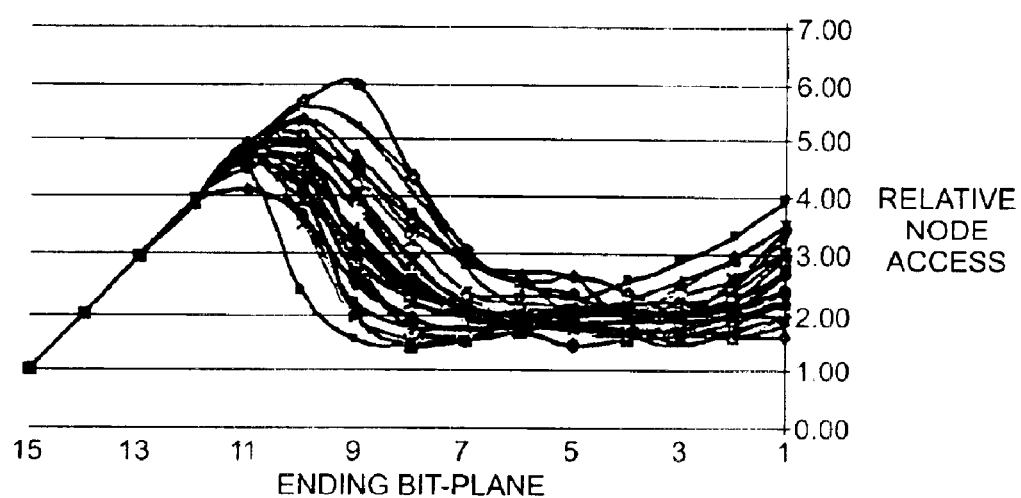
FIG. 13 is a graph of simulations of running an exemplary algorithm on multiple test images, showing number of nodes accessed vs. ending bit-plane.

As shown in FIG. 13, which presents detailed simulations of processing using test images, the net effect of this embodiment is to reduce the number of nodes accessed by the LIFTS algorithm by a factor of 2 on average, as calculated for a set of 31 test images. Without this refinement of the algorithm, all active nodes must be accessed once for every bit-plane.

Figure 15:
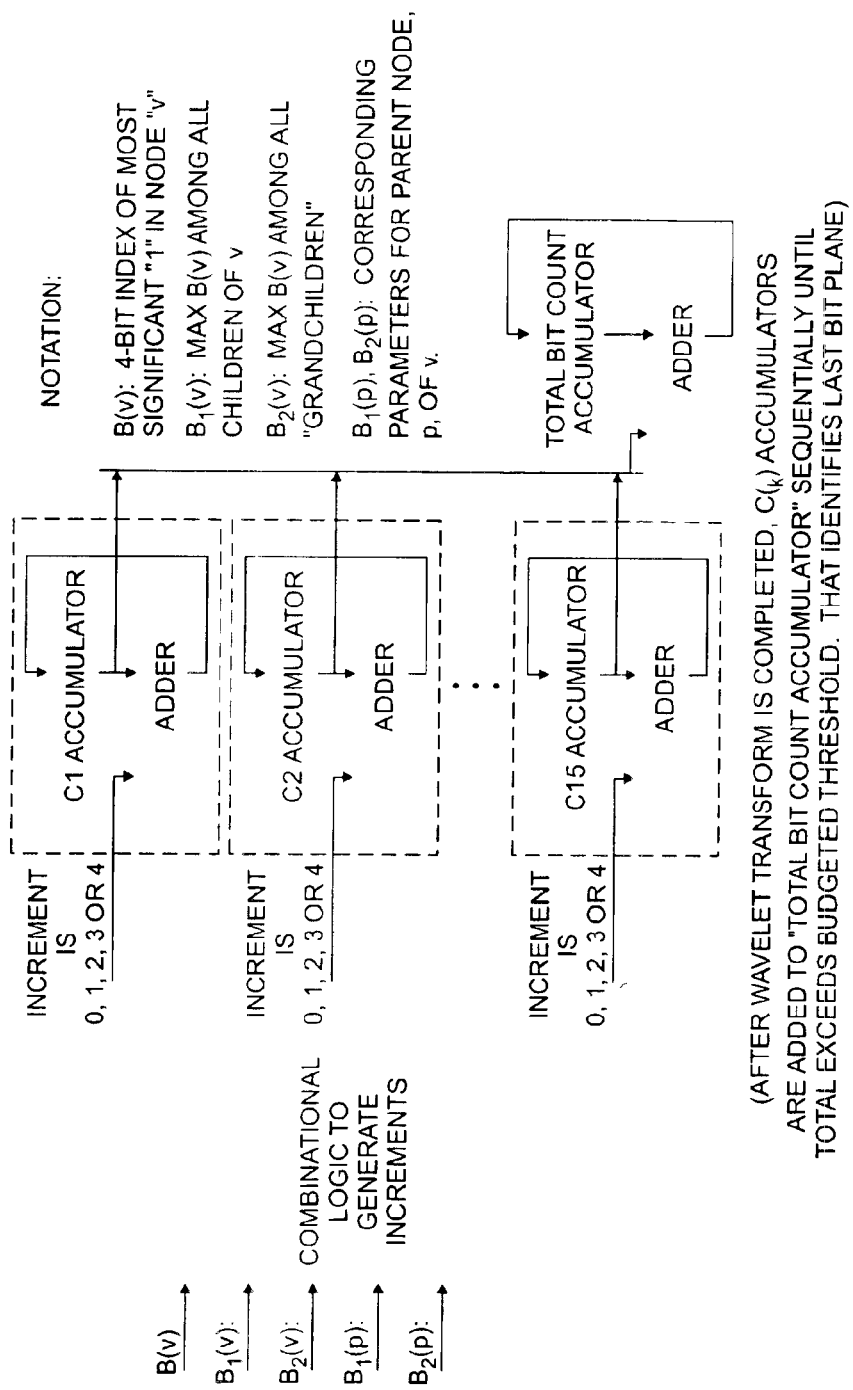
FIG. 15 is a diagram showing storing coefficient data incrementally in accumulators for most-to-least significant bit-planes, and accumulating the total bit-count.

An example of the process is implemented as shown in FIG. 15. For a 16 bit image, 15 accumulators are maintained in the Wavelet Transform Processor 15, one accumulator being associated with each bit plane. These are denoted as C15, C14, . . . , C1, with C15 corresponding to the most significant bit plane, and C1 the least significant bit plane. Each accumulator C15 . . . C1 is incremented as each Wavelet coefficient is stored, by the number of bits that coefficient will contribute to the corresponding bit plane.

Figure 14:
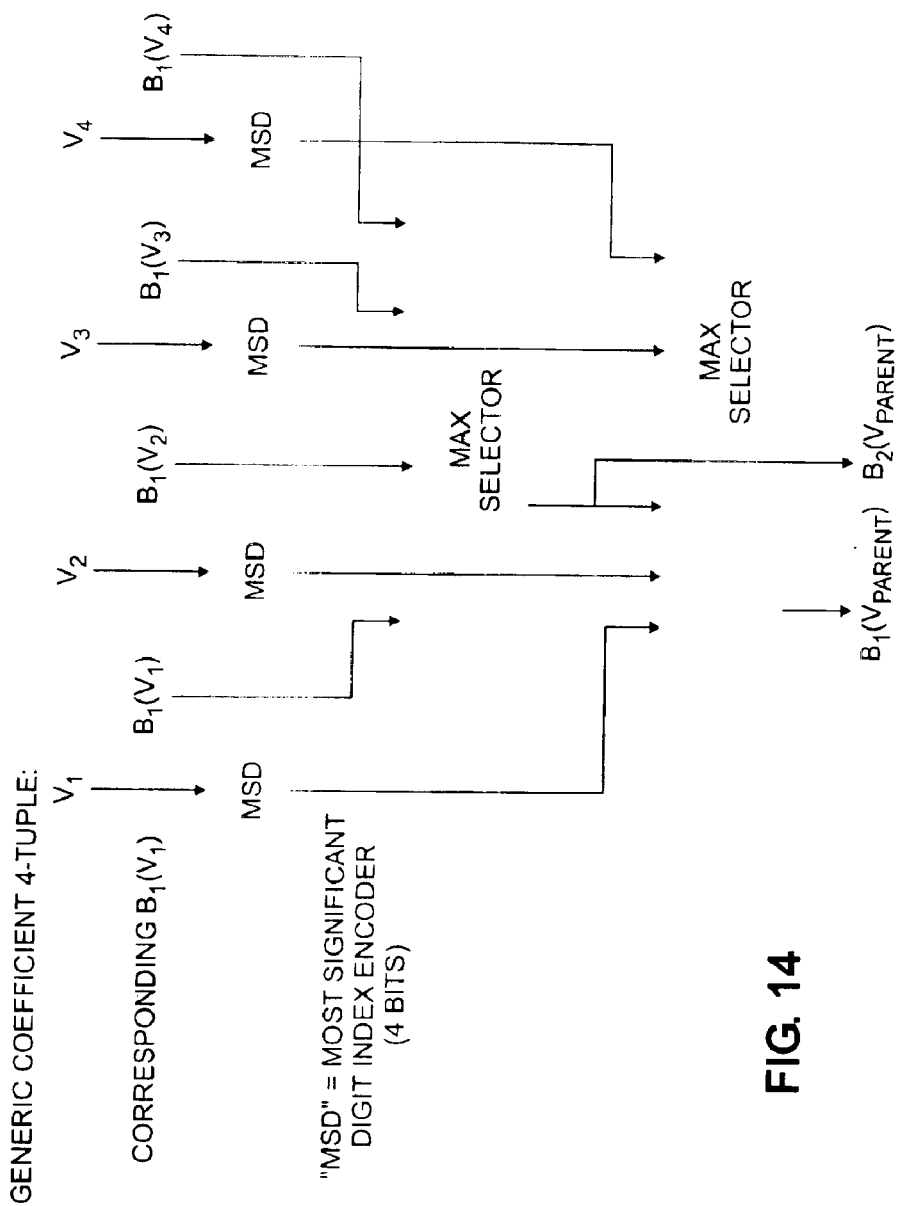
FIG. 14 is a diagram of extraction logic.

FIG. 15 shows the relationship in the 15 bit-plane example of the 4-bit parameters $B_1(v)$, $B_2(v)$, $B_1(p)$, and $B_2(p)$ where (p) is the parent of a given node and where B(v) is defined as the 4-bit index of the most significant "1" in coefficient "V". FIG. 14 shows the logic required at the output of the Wavelet Transform Processor 16 as the coefficients are stored at the machine cycle rate as coefficient v is stored with $B_1(v)$ and $B_2(v)$ attached, and $B_1(p)$ and $B_2(p)$ available. Because of the sequence in which results are generated, an increase in staging memory is required in the Wavelet Processor since, as FIG. 14 illustrates, the "parent" parameters are not known until the last $v_i$ of the 4-tuple is generated.

The combinational logic block shown in FIG. 15 generates the increments to the C(k) accumulators, and corresponds to Eq. (8), and is described as follows. As v is stored, the following accumulators are incremented:

a) Increment accumulators $C[B_1(p)]$ through $C[1]$ by 1
b) Increment accumulators $C[B_2(p)]$ through $C[B_1(v)]$ by 1
c) Increment accumulators $C[B_1(v)]$ through $C[B_2(v)]$ by 1
d) Increment accumulator $C[B(v)]$.

Any given accumulator may be incremented by a value of 0 through 4. To express these relations for accumulator k, we define four Boolean expressions as follows:

$A=1$ iff: $(B_1(p)>=k>=1)$ $B=1$ iff: $(k=B(v))$ $C=1$ iff $(B_2(p)>=k>=B_1(v))$ $D=1$ iff $(B_1(v)>=k>=B_2(v))$ Then variables A–D are treated as arithmetic variables and summed to form the increment for accumulator k.

The process allows determining at what plane the compression will end. As the tree-sets are sequentially processed, the processor 15 keeps running tally of how many bits are contributed to the last plane; and compares that tally to the amount allowed in the last plane as determined by the logic of FIG. 14. After this limit is met, the compression algorithm then extracts only bits from higher planes for the remaining tree sets.

In contrast to the two-step algorithm in the first example (a two-step scheme consisting of running the wavelet coefficient and $B_1$, $B_2$ parameter computations, followed by the emission of a truncated set of compressed bits corresponding to a predetermined maximum bit threshold), loss-less compression is readily possible in the single step of the present embodiment. As soon as a wavelet coefficient and its associated parameters are determined, the resulting bits can be emitted.

To allow transmission of truncated results, the output bits may be ordered appropriately, e.g., by maintaining separate output queues for each bitplane, and/or maintaining sets of subtrees corresponding, for example, to sub-images. Thus, one can precompute and store an image in compressed form, and retrieve an image up to some number of bits.

This implementation of the Wavelet transform computes wavelet coefficients as soon as sufficient data becomes available, and produces complete trees at a steady rate. Accordingly, the "on the fly" algorithms described above can be used to encode data at a constant rate relative to an input data stream. An example of such use is with a satellite transmitter producing a scan-line (x dimension) in a number of frequencies (f dimension) as it traverses in orbit (y dimension). In a two-dimensional version of the algorithm, data are collected for all frequencies f for each consecutive x-value. Given a 2-dimensional s step transform, complete trees are available after $2^s$ consecutive x values have been processed, and can therefore be encoded with either of the two schemes outlined above. A three dimensional transform similarly completes a set of trees each time $2^s$ f-x planes have been collected which may be encoded in turn.

Figure 16:
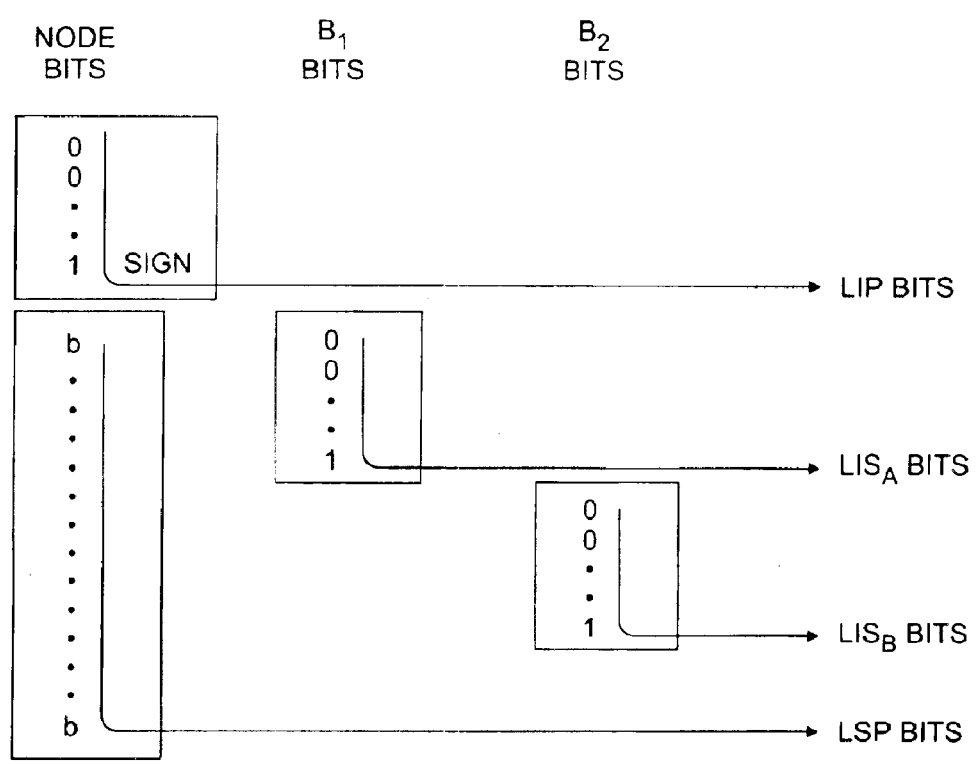
FIG. 16 is a diagram of queueing the bit output to conform to SPIHT-like ordering.

The SPIHT-like order post-processing may be performed efficiently using three queues as illustrated in FIG. 16. The bit-counts for a given bit-plane may also be used advantageously if bits are to be emitted in an order similar to that of SPIHT (i.e., LIP bits followed by LIS bits followed by LSP bits as defined in SPIHT up to a given maximum of bits in the terminating bit-plane. This can most readily be achieved by emitting all bits up to but not including the ending bit-plane in any order consistent with the decoder. Bits for the ending bit-plane are emitted to three queues. The first queue (the LIP queue) receives the LIP bits (essentially the node bits for b>B(v) in FIG. 12). A second queue (the LIS queue) receives the b=B(v) and signum bits and the $B_1$ and $B_2$ bits. A third queue (the LSP) queue, receives the remaining node value bits. Upon completion of the encoding, the LIP queue is emptied first, followed by the LIP queue and finally the LSP queue, stopping as soon as the allowed maximum number of bits is reached.

Importantly, knowledge of the bit distribution allows the changing of traversal order between the encoder and the decoder. Thus, encoding is performed by producing bits from bottom-right to top-left in FIG. 11; and decoding is done by producing bits from top left to bottom right. The bottom-up encoding can be done, as stated, "on the fly" as soon as the Wavelet coefficient is produced.

Appendix A

A recursive version of the process, with depth first traversal and a single output queue in pseudo-code.

```
Traversal all treeless nodes and all tree roots
for each bit-plane from b_max to 1 {
  for each treeless coefficient v {
    encode_bit ( v, b )
  }
  for each tree root v encode_tree( v, b )
}
Treat current node, and descend in tree when appropriate
encode_tree( node v, bit-plane b ) {
  encode_bit(v,b)
  if b > B_1(v) output 0
  else if b = B_1(v) output 1
  if b = B_1(v) {
    output 1
    if B_2(v) = 0 {
      encode_children( v, b )
    } else if b = B_2(v) {
      output 1
      encode_sub_trees ( v, b )
    } else {
```

-continued

```
    output 0
    encode_children( v, b )
  }
} else if b < B₁(v) {
  if B₂(v) = 0 {
    encode_children( v, b )
  } else if b > B₂(v) {
    output 0
    encode_children( v, b )
  } else if b = B₂(v) {
    output 1
    encode_sub_trees( v, b )} else {
    encode_sub_trees( v, b )
  }
  }
 }
}
Encoder Bit Output:
encode_bit( node v, bit-plane b ) {
  output bit b of v
  if B(v) = b output signum(v)
}
Encoder Child Traversals:
encode_children(node v, bit-plane b ) {
  for each child c of v encode_bit( c, b )
}
encode_sub_trees(node v, bit-plane b ) {
  for each child c of v encode_tree( v, b )
}
```

Appendix B

A parallelized version of the decoder for the reference algorithm reconstructs the Wavelet coefficients one at a time by separately accessing bits from every bit-plane.

```
Traversal all treeless nodes and all tree roots
for each treeless coefficient v {
  v = 0
  for each bit-plane b from b_max to 1 {
    decode_bit ( v, b )
  }
}
for each tree root v {
  v = B₁(v) = B₂(v) = 0
  decode_node ( v, b_max, b_min )
  for each child c of v {
    if B₁(v) = 0 zero_sub_tree(c )
    else decode_sub_tree(c, B₁(v), B₂(v))
  }
}
Zero a sub-tree:
zero_sub_tree ( v ) {
  v = B₁(v) = B₂(v) = 0
  for each child c of v zero_sub_tree( c )
}
Decode a sub-tree: Recursively descend in the tree
decode_sub_tree( v, b_1, b_2 ) {
  v = B₁(v) = B₂(v) = 0
  for each bit-plane b in [b_1, b_2) {
    decode_bit ( v, b )
  }
  decode_node(v, b_2, b_min )
  for each child c of v {
    if B₁(v) = 0 zero_sub_tree( c )
    else decode_sub_tree(c, B₁(v), B₂(v))
  }
}
Decode a node: Get all traversal bits
decode_node( v, b_1, b_2 ) {
  for each bit-plane b in [b_1, b_2] {
    decode_bit( v, b )
    if B₁(v) = 0 {
      input bit from bit-plane b
      if bit = 1 {
        if bit = 1 { B₂(v) = b }
```

```
      }
    }
  } else if v has grandchildren{
    if B₂ = 0 {
      input bit from bit-plane b
      if bit = 1 { B₂(v) = b }
    }
  }
  }
}
Decoder Bit Input
decode_bit ( node v, bit-plane b ) {
  if B(v) = 0 {
  input bit b of v from bit-plane b
  if bit = 1 input signum(v)
  } else {
    input bit b of v from bit-plane b
  }
  if v ≠ 0 {
    round by setting bit b-1 of v to 1
  }
```

What is claimed is:

1. In a Wavelet transform process for compressing digital data representative of an object, a method for accelerating the encoding of bits, comprising the steps of:
   performing a Wavelet transform on said digital data thus forming hierarchical tree data, each node of each tree in said tree data containing Wavelet transform coefficients and associated parameters, each tree having a root node v, the bits for every said tree being a contained in bit_lanes;
   as said Wavelet transform coefficients are obtained, counting for each said bit-plane the bits of: said node v; $B_1(v)$ bits representing the magnitude of the Wavelet transform coefficients associated with all descendents of a said node v; and $B_2(v)$ bits representing the magnitude of the Wavelet transform coefficients associated with all grandchildren and their descendents of said node V;
   accumulating said bit-counts during computing of said Wavelet transform;
   emitting all bits produced by said node as soon as said node is processed; and
   stopping the production of unneeded bits upon reaching a stopping criterion.

2. The method of claim 1, wherein said stopping step further comprises setting a bit-budget allocated among said bit-planes, said budget fixing the maximum number of bits allowed to be emitted from said coefficients at each said node during processing.

3. The method of claim 1, comprising the further steps of:
   maintaining a bit-counter for each said bit-plane;
   summing the total number of bits produced in each said bit-plane to determine within a fixed bit_budget the exact number of bits emitted in the last plane examined; and
   stopping said bit summing at said point.

4. The method of claim 2, wherein the number of bits emitted by a said node in a given said bit-plane includes a value bit for bit-planes b such that $B_1(p) \geq b$ where p is a parent node.

5. The method of claim 4, wherein the number of bits emitted by a said node in a given said bit-plane includes a signum bit for bit-planes b of b=B(v).

6. The method of claim 5, wherein the number of bits emitted by a said node in a given said bit-plane includes emitting a $B_1$ bit for $B_2(p) \geq b \geq B_1(v)$.

7. The method of claim 6, wherein the number of bits emitted by a said node in a given said bit-plane includes emitting a $B_2$ bit for $B_1(v) \geq b \geq B_2(v)$.

8. The method of claim 7, further comprising the step of maintaining separate output queues in accordance with predetermined criteria.

9. The method of claim 7, comprising the further step of designating subtrees in said tree corresponding to sub-parts of said object.

10. The method of claim 7, further comprising the steps of:
providing a plurality of accumulators corresponding to the number of said bit-planes being processed, sequenced from the most significant to the least significant bit-plane; and
incrementing each said accumulator as each said Wavelet coefficient is stored by the number of bits that said coefficient will contribute to the corresponding said bit-plane.

11. The method of claim 1, comprising the further step of extracting only bits from higher planes for the remaining trees after said bit-budget is reached for a given tree.

12. The method of claim 7, comprising the further steps of:
instructing said nodes to emit bits from said bit-planes up to and including an ending bit-plane, until a predetermined said bit-budget allocated to said ending bit-plane is reached; and
forming said bits emitted from said ending bit-plane in three queues, the first said queue receiving bits comprising the node bits for $b \geq B(v)$; the second said queue receiving $b=B(v)$ bits, said signum bits, and said $B_1$ and $B_2$ bits; and the third said queue receiving remaining node value bits.

13. The method of claim 1, wherein said emitting step comprises the further steps of:
instructing an active node to describe its own coefficients and emit bits subject to a bit-dtopping criterion;
determining whether any node below said active node is large enough to continue traversal based on a node selection criterion and a stopping criterion; and
returning to said traversal algorithm if said determination is negative.

14. The method of claim 13, comprising the further step of:
activating, as determined by a tree traversal criterion and a node selection criterion, all children of said active node when said determination is affirmative; and
subject to a bit emission stopping criterion, instructing said children nodes to describe their coefficients and to emit all relevant bits in turn.

15. The method of claim 14, comprising the further step of computing concurrently the bits of plural ones of selected said nodes.

16. The method of claim 15, wherein said process further comprises the step of receiving and decoding said encoding bits.

17. The method of claim 16, comprising the further step of changing the order of traversal between encoding and decoding of said bits.

18. In a Wavelet transform process for compressing digital data representative of an object, the improvement comprising:
performing a sub-band decomposition of said digital data into hierarchical tree data of Wavelet transform coefficients;
traversing the subtrees associated with each tree node v; in the course of said traversing,
determining the highest bit-plane in which any direct descendant of said node v has a non-zero bit and the highest bit-plane in which any indirect descendant of node v has a non-zero bit; and
determining the highest the bit-plane $B(v)$ in which the coefficient v of said node v has a non-zero bit; and
within a fixed bit-budget allocated among said bit-planes, emitting the bits generated into an output queue.

* * * * *

UNITED STATES PATENT AND TRADEMARK OFFICE
CERTIFICATE OF CORRECTION

PATENT NO. : 6,885,774 B2
DATED : April 26, 2005
INVENTOR(S) : Egbert Ammicht et al.

It is certified that error appears in the above-identified patent and that said Letters Patent is hereby corrected as shown below:

Column 1,
After line 4, please insert the following:
-- STATEMENT REGARDING FEDERALLY-SPONSORED RESEARCH OR DEVELOPMENT
    This invention was made with U.S. Government support under Agreement No. NMA202-97-9-1050 awarded by the National Imagery and Mapping Agency. The U.S. Government has certain rights in the invention. --.

Signed and Sealed this

Twenty-third Day of August, 2005

JON W. DUDAS
*Director of the United States Patent and Trademark Office*